United States Patent [19]
Gold et al.

[11] Patent Number: 5,790,591
[45] Date of Patent: Aug. 4, 1998

[54] SPREAD SPECTRUM TRANSMITTER AND COMMUNICATIONS SYSTEM USING MULTIPLE SPREADING CODES

[75] Inventors: Robert Gold, Los Angeles; Robert C. Dixon, Palmer Lake, both of Calif.

[73] Assignee: Omnipoint Corporation, Colorado Springs, Colo.

[21] Appl. No.: 432,907

[22] Filed: May 1, 1995

Related U.S. Application Data

[63] Continuation-in-part of Ser. No. 146,491, Nov. 1, 1993, abandoned.

[51] Int. Cl.[6] .................. H04B 1/707; H04K 1/00
[52] U.S. Cl. .................. 375/206; 375/210; 380/31; 380/42
[58] Field of Search .................. 375/200, 206, 375/208, 210, 209; 380/9, 28, 31, 42

[56] References Cited

U.S. PATENT DOCUMENTS

| | | | |
|---|---|---|---|
| 4,100,498 | 7/1978 | Alsup et al. | 328/14 |
| 4,164,628 | 8/1979 | Ward et al. | 179/15 BA |
| 4,189,677 | 2/1980 | Cooper et al. | 325/321 |
| 4,217,563 | 8/1980 | Vale | 330/150 |
| 4,222,115 | 9/1980 | Cooper et al. | 375/1 |
| 4,231,005 | 10/1980 | Taylor | 343/5 NQ |
| 4,247,942 | 1/1981 | Hauer | 375/24 |
| 4,285,060 | 8/1981 | Cobb et al. | 375/1 |

(List continued on next page.)

FOREIGN PATENT DOCUMENTS

| | | | |
|---|---|---|---|
| 3984485 | 9/1985 | Australia | H04B 7/26 |
| 1-39126 | 2/1989 | Japan | H04B 1/16 |
| 8700370 | 1/1987 | WIPO | H04J 13/00 |
| 2211053 | 6/1989 | WIPO | H04L 9/00 |
| 9318601 | 9/1993 | WIPO | H04L 27/30 |
| 9501018 | 1/1995 | WIPO | H04K 1/00 |
| 9503652 | 2/1995 | WIPO | H04B 7/26 |
| 9506365 | 3/1995 | WIPO | H04B 7/04 |
| 9512938 | 5/1995 | WIPO | H04J 13/00 |
| 9512943 | 5/1995 | WIPO | H04L 25/02 |

OTHER PUBLICATIONS

Freret, Payne, et al., *Applications of Spread–Spectrum Radio to Wireless Terminal Communications*, Proceedings of the IEEE, 1980, pp. 69. 7. 1–69 . 7 . 4.

Kavehrad, M. and P. J. McLane, *Performance of Low–Complexity Channel Coding and Diversity for Spread Spectrum in Indoor, Wireless Communication*, AT&T Technical Journal, vol. 64, No. 8, Oct. 1985, pp. 1927–1965.

Nanayakkara, S., *High Speed Receiver Designs Based on Surface Acoustic Wave Devices*, Sixth International Conference On Digital Statellite Communications, Sep. 1983, pp. 16–22.

(List continued on next page.)

*Primary Examiner*—Chi H. Pham
*Assistant Examiner*—William Luther
*Attorney, Agent, or Firm*—Lyon & Lyon LLP

[57] ABSTRACT

A spread spectrum transmitter for generating a plurality of spread spectrum codes comprises a shift register having a plurality of stages, with a plurality of tap sets connected to selected ones of said stages. Each tap set defines a different spread spectrum code, which may be maximal or non-maximal. Outputs from the tap sets are combined using exclusive-OR gates and fed back to through a table of logic gates to the input of the shift register. A serial data register is loaded from a data stream and clocked periodically into a parallel data register. The parallel data register corresponds to a data symbol and is connected to the table, whereby one of the spread spectrum codes at a time is selected. A code portion of the spread spectrum code up to a designated length is generated for each data symbol. More than one code portion may be simultaneously sent using offset quadrature phase shift keying. A receiver may detect the code portion or code portions sent by delaying the received signal and combining it with a plurality of delayed versions thereof, the delay period for each delayed version corresponding to the tap locations in the tap set of the transmitter shift register.

33 Claims, 18 Drawing Sheets

U.S. PATENT DOCUMENTS

| | | | |
|---|---|---|---|
| 4,291,410 | 9/1981 | Caples | 375/1 |
| 4,301,530 | 11/1981 | Gutleber | 370/1 |
| 4,320,514 | 3/1982 | Haskell | 375/1 |
| 4,324,001 | 4/1982 | Rhodes | 375/90 |
| 4,327,438 | 4/1982 | Baier et al. | 375/1 |
| 4,338,579 | 7/1982 | Rhodes | 332/21 |
| 4,355,399 | 10/1982 | Timor | 375/80 |
| 4,355,411 | 10/1982 | Reudink et al. | 455/33 |
| 4,392,231 | 7/1983 | Henry | 376/76 |
| 4,418,393 | 11/1983 | Zachiele | 364/724 |
| 4,418,425 | 11/1983 | Fennel et al. | 455/27 |
| 4,435,821 | 3/1984 | Ito et al. | 375/1 |
| 4,481,640 | 11/1984 | Chow et al. | 375/1 |
| 4,506,372 | 3/1985 | Massey | 375/116 |
| 4,517,679 | 5/1985 | Clark et al. | 375/37 |
| 4,525,835 | 7/1985 | Vance et al. | 370/29 |
| 4,538,281 | 8/1985 | Rajan | 375/2.2 |
| 4,550,414 | 10/1985 | Guinon et al. | 375/1 |
| 4,561,089 | 12/1985 | Rouse et al. | 370/18 |
| 4,563,774 | 1/1986 | Gloge et al. | 455/607 |
| 4,567,588 | 1/1986 | Jerrim | 370/18 |
| 4,583,048 | 4/1986 | Gumacos et al. | 329/122 |
| 4,587,662 | 5/1986 | Langewellpott | 375/1 |
| 4,599,732 | 7/1986 | Lefever | 375/13 |
| 4,601,047 | 7/1986 | Horwitz et al. | 375/2.2 |
| 4,606,039 | 8/1986 | Nicolas et al. | 375/1 |
| 4,621,365 | 11/1986 | Chiu | 375/1 |
| 4,630,283 | 12/1986 | Schiff | 375/1 |
| 4,638,494 | 1/1987 | Kartchner et al. | 375/2.2 |
| 4,647,863 | 3/1987 | Skudera et al. | 329/112 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,686,688 | 8/1987 | Chung et al. | 375/47 |
| 4,688,210 | 8/1987 | Eizenhofer et al. | 370/18 |
| 4,691,326 | 9/1987 | Tauchiya | 375/1 |
| 4,707,839 | 11/1987 | Andren et al. | 375/1 |
| 4,754,453 | 6/1988 | Eizenhofer | 370/95 |
| 4,759,034 | 7/1988 | Nagazumi | 375/1 |
| 4,774,715 | 9/1988 | Messenger | 375/1 |
| 4,787,093 | 11/1988 | Rorden | 375/23 |
| 4,804,938 | 2/1989 | Rouse et al. | 340/310 |
| 4,805,208 | 2/1989 | Schwartz | 379/93 |
| 4,807,222 | 2/1989 | Amitay | 370/85 |
| 4,811,357 | 3/1989 | Betts | 375/1 |
| 4,815,106 | 3/1989 | Prop et al. | 375/36 |
| 4,837,786 | 6/1989 | Gurantz et al. | 370/20 |
| 4,864,589 | 9/1989 | Endo | 375/1 |
| 4,894,842 | 1/1990 | Brockenhoven et al. | 375/1 |
| 4,901,307 | 2/1990 | Gilhousen et al. | 370/18 |
| 4,905,221 | 2/1990 | Ichiyoshi | 370/18 |
| 4,918,689 | 4/1990 | Hui | 370/85.9 |
| 4,972,431 | 11/1990 | Keegan | 375/1 |
| 4,979,186 | 12/1990 | Fullerton | 375/23 |
| 4,984,247 | 1/1991 | Kaufmann et al. | 375/1 |
| 5,016,255 | 5/1991 | Dixon et al. | 375/1 |
| 5,016,260 | 5/1991 | Masuda | 375/66 |
| 5,022,047 | 6/1991 | Dixon et al. | 375/1 |
| 5,023,887 | 6/1991 | Takeuchi et al. | 375/1 |
| 5,042,082 | 8/1991 | Dahlin | 455/33 |
| 5,063,571 | 11/1991 | Vancraeynest | 375/1 |
| 5,081,642 | 1/1992 | O'Clock et al. | 375/1 |
| 5,081,643 | 1/1992 | Schilling | 375/1 |
| 5,103,459 | 4/1992 | Gilhousen et al. | 375/1 |
| 5,132,986 | 7/1992 | Endo et al. | 375/1 |
| 5,146,471 | 9/1992 | Cowart | 375/1 |
| 5,157,686 | 10/1992 | Omura et al. | 375/1 |
| 5,166,929 | 11/1992 | Lo | 370/85.3 |
| 5,166,952 | 11/1992 | Omura et al. | 375/1 |
| 5,170,412 | 12/1992 | Massey | 375/1 |
| 5,177,766 | 1/1993 | Holland et al. | 375/1 |
| 5,206,882 | 4/1993 | Schloemer | 375/1 |
| 5,210,770 | 5/1993 | Rice | 375/1 |
| 5,216,691 | 6/1993 | Kaufmann | 375/1 |
| 5,224,120 | 6/1993 | Schilling | 375/1 |
| 5,235,615 | 8/1993 | Omura | 375/1 |
| 5,243,622 | 9/1993 | Lux et al. | 375/1 |
| 5,253,268 | 10/1993 | Omura et al. | 375/1 |
| 5,255,288 | 10/1993 | Ichihara | 375/64 |
| 5,276,705 | 1/1994 | Higgins et al. | 375/1 |
| 5,280,472 | 1/1994 | Gilhousen et al. | 370/18 |
| 5,280,537 | 1/1994 | Sugiyama et al. | 375/1 |
| 5,289,497 | 2/1994 | Jacobson et al. | 375/1 |
| 5,291,515 | 3/1994 | Uchida et al. | 375/1 |
| 5,313,457 | 5/1994 | Hostetter et al. | 370/18 |
| 5,341,396 | 8/1994 | Higgins et al. | 375/1 |
| 5,345,469 | 9/1994 | Fulghum | 375/1 |
| 5,347,284 | 9/1994 | Volpi et al. | 342/356 |
| 5,353,300 | 10/1994 | Lee et al. | 375/1 |
| 5,353,303 | 10/1994 | Walthall | 375/1 |
| 5,392,287 | 2/1995 | Tiedemann et al. | 370/95.1 |
| 5,400,359 | 3/1995 | Hikoso et al. | 375/1 |
| 5,402,413 | 3/1995 | Dixon | 370/18 |
| 5,410,568 | 4/1995 | Schilling | 375/205 |
| 5,414,728 | 5/1995 | Zechavi | 395/2.3 |
| 5,414,796 | 5/1995 | Jacobs et al. | 395/2.3 |
| 5,416,797 | 5/1995 | Gilhousen et al. | 375/705 |
| 5,428,631 | 6/1995 | Zehavi | 371/43 |
| 5,434,888 | 7/1995 | Fukuchi | 375/307 |
| 5,442,662 | 8/1995 | Fukasawa et al. | 375/205 |
| 5,454,028 | 9/1995 | Hara et al. | 379/61 |
| 5,467,367 | 11/1995 | Izumi et al. | 375/206 |
| 5,469,468 | 11/1995 | Schilling | 375/200 |
| 5,469,469 | 11/1995 | Haines | 375/201 |
| 5,471,497 | 11/1995 | Zehavi | 375/200 |
| 5,481,533 | 1/1996 | Honig et al. | 370/18 |
| 5,488,629 | 1/1996 | Takahashi et al. | 375/206 |
| 5,610,940 | 3/1997 | Durrant et al. | 375/208 |

OTHER PUBLICATIONS

Collins, J. H. et al., *The Role of Surface Acoustic Wave Technology in Communication Systems*, Ultrasonics, Mar. 1972, vol. 10, No. 2, pp. 59–71.

Hagon, P.J. et al., *A Programmable Surface Acoustic Wave Matched Filter for Phase–Coded Spread Spectrum Waveforms*, IEEE Transactions on Microwave Theory and Techniques, Apr. 1973, vol. 21, No. 4, pp. 303–306.

Baier, A. et al., *Digital Matched Filtering of Arbitrary Spread–Spectrum Waveforms Using Correlators with Binary Quantization*, 2 Proceedings, 1983, IEEE Military Communications Conference, Oct. 1983, pp. 418–423.

Baier, A., *A Low–Cost Digital Matched Filter for Arbitrary Constant–Envelope Spread Spectrum Waveforms*, IEEE Transactions on Communications, Apr. 1984, vol. Com–32, No. 4, pp. 354–361.

Dixon, Robert C., *Spread Spectrum Systems with Commercial Applications* (J. Wiley & Sons, 3d ed. 1994).

Colvin, Roger D., *Correlators And Convolvers Used In Spread Spectrum Systems*, National Telecommunications Conference, Conference Record vol. 1 of 4, 1982, pp. 22.4.1–22.4.5.

Sust, M. K. et al., *All Digital Signal Processing In A Spread Spectrum Communication System*, Proceedings of Melecon '87, Mar. 24–26, 1987, pp. 157–161.

Dual 64–TAP, 11 Mcps Digital Matched Filter Stel–3340, publication of Stanford Telecom, Jul. 1993, pp. 1–12.

Vale, Christopher R., *Saw Quadraphase Code Generator*, IEEE Transactions On Microwave Theory and Techniquest, vol. MTT-29, No. 5, May 1981, pp. 410-414.

Unkauf, Manfred G., *Surface Wave Devices in Spread Spectrum Systems*, Surface Wave Filters (Wiley 1977), pp. 477-509Ziemer, Rodger et al., *Conversion and Matched Filter Approximations for Serial Minimum-Shift Keyed Modulation*, IEEE Transactions on Communications, vol. Com. 30, No. 3, Mar. 1982, pp. 495-509.

Cohen, Marvin N. et al., *Minimum Peak Sidelobe Pulse Compression Codes*, IEEE International Radar Conference, 1990, pp. 633-638.

Skolnik, Merrill I., *Radar Handbook*, pp. 10.10-10.12 (McGraw-Hill, 2d ed. 1990).

Campbell, Colin K., *Applications of Surface Acoustice and Shallow Bulk Acoustic Wave Devices*, Proceedings of the IEEE, Oct. 1989, pp. 1453-1484.

PCS2000 A Composite CDMA/TDMA Air Interface Compatibility Standard for Personal Communications in 1.8 -2.2 GHz for Licensed and Unlicensed Applications.

Eschenbach, Ralph, *Applications of Spread Spectrum Radio to Indoor Data Communications*, Proceedings of the IEEE, 1982, p. 34.5-1.

Freret, Payne, *Wireless Terminal Communications Using Spread Spectrum Radio*, Proceedings of the IEEE, 1980, pp. 244-248.

Taylor, John W., Jr. et al., *Quadriphase Code-A Radar Pulse Compression Signal With Unique Characteristics*, IEEE Transactions on Aerospace and Electronic Systems, vol. 24, No. 2, Mar. 1988, pp. 156-170.

Ziemer, Rodger et al., *Conversion and Matched Filter Approximations for Serial Minimum-Shift Keyed Modulation*, IEEE Transactions on Communications, vol. Com. 30, No. 3, Mar. 1982, pp. 495-509.

Gold, Robert, *Optimal Binary Sequences for Spread Spectrum Multiplexing*, IEEE Transactions On Information Theory, IT-13(4): 619-621, Oct. 1967.

Gold, Robert, *Characteristic Linear Sequences And Their Coset Functions*, J. SIAM Appl. Math. 14(5): 980-985, Sep. 1966.

Cohen, Marvin N., "Pulse Compression in Pulsed Doppler Radar Systems," reprinted in Morris, Guy V., *Airbourne Pulsed Doppler Radar*, Chap. 8, pp. 123-155, 1988.

Rohling, Hermann et al., "Mismatched-Filter Design for Periodical Binary Phased Signals", *IEEE Transactions On Aerospace and Electronic System*, 25(6):890-897, Nov. 1989.

Stark, W.E., *Perfomance of Concatenated Codes on Channels With Jamming*, IEEE International Conference on Communications, Catalog No. 82CH1766-5, vol. 3 of 3, pp. 7E.4.1-7E.4.5, Jun. 13-17, 1982.

Bozatas, Serdar et al., *4-Phase Sequences with Near-Optimum Correlation Properties*, IEEE Transactions On Information Theory, 38(3):1101-1113, May 1992.

Hammons, A. Roger et al., *The $Z_4$-Linearity of Kerdock, Preparata, Goethals, and Related Codes*, IEEE Transactions On Information Theory, 40(2):301-319, Mar. 1994.

Anderson, John B. et al., *Digital Phase Modulation*, (Plenum Press, 1986), pp. 22-26.

Anderson, John B. et al., *Digital Phase Modulation*, (Plenum Press, 1986), pp. 50-53.

Anderson, John B. et al., *Digital Phase Modulation*, (Plenum Press, 1986), Chap. 6, pp. 211-235.

Anderson, John B. et al., *Digital Phase Modulation*, (Plenum Press, 1986), Chap. 7, pp. 237-271.

Kavehrad, Mohsen et al., *Direct Sequence Spread Spectrum with DPSK Modulation and Diversity for Indoor Wireless Communications*, IEEE Transactions on Communications, Com-35(2):224-226, Feb. 1987.

Kavehrad , M. et al., *Spread Spectrum for Indoor Digital Radio*, IEEE Communications Magazine, 25(5):32-40, Jun. 1987.

Ruprecht, jurg, *Code Time Division Multiple Access: A Method for the Orthogonalization of CDMA Signals in Multipath Environment*, Aachener Kolloquium "Signal theorie", Mobile Kommunikation Systems , Mar. 1994, pp. 1-8.

Saleh, Adel A.M. et al., *An Experimental TDMA Indoor Radio Communications System Using Slow Frequency Hopping and Coding*, IEEE Transactions on Communications, 39(1):152-161, Jan. 1991.

Shaft, Paul D., *Low-Rate Convolutional Code Applications in Spread-Spectrum Communications*, IEEE Transactions on Communications, Com-25(8):815-821, Aug. 1977.

Wolff, S. S. et al., *The Polarity-Coincidence Correlator: A Nonparametric Detection Device*, IRE Transactions on Information Theory, IT-8(1):5-9, Jan. 1962.

Joint Technical Committee on Wireless Access (JTC) Omnipoint Candidate Air Interface Solution [Includes Proprietary Information]Date: Nov. 1, 1993.

Joint Technical Committee on Wireless Access -JTC(Air) Standards Contribution (Air Interface Standards Project) Date: Mar. 21, 1994.

Proakis, John G., *Digital Communications* (McGraw-Hill, 2d ed. 1989), pp. 831-836.

Hakizimana, Gaspard et al., "A New M-ary Wideband Communication System with Application to Multipath Channels -Part I: System Performance", *IEEE Transactions on Communications*, 43(1):127-135, Jan. 1995.

Feher, Kamilo, *JTC Modulation Standard Group-FQPSK Consortium -Spectrum utilization with compatible/expandable GMSK, QPSK and FQPSK*, JTC: Joint Technical Committee On Wireless Access, Jan. 1994.

Simon, Marvin K. et al., *Spread Spectrum Communications Handbook*, pp. 7-9, 262-266, 269-270, 297-299, 352-353 (1994).

SELECTED CHIP SEGMENT = 1 1 0 0 0 1 1 1

SPREAD SPECTRUM TRANSMITTER AND COMMUNICATIONS SYSTEM USING MULTIPLE SPREADING CODES

CROSS-REFERENCE TO RELATED APPLICATION

This application is a continuation-in-part of application Ser. No. 08/146,491, filed Nov. 1, 1993 now abandoned, in the name of the same inventors, entitled "Despreading/ Demodulating Direct Sequence Spread Spectrum Signals," which is hereby incorporated by reference as if fully set forth herein.

BACKGROUND OF THE INVENTION

1. Field of the Invention

This invention relates to the field of spread spectrum communication and, more particularly, to despreading and demodulating spread spectrum signals.

2. Description of Related Art

Direct sequence modulation of a carrier signal is a known technique for generating wide-band, low power density signals which have statistical properties similar to random noise.

In a common method of direct-sequence spread spectrum modulation, a pseudo-random chip sequence (also called a pseudo-noise code sequence or a PN code sequence) is used to encode data which is then placed on a carrier waveform. The chipping rate of the pseudo-random sequence is usually much higher than the data rate. The resulting encoded signal is generally spread across a bandwidth exceeding the bandwidth necessary to transmit the data, hence the term "spread spectrum".

At the receiving end, the receiver produces a correlated signal in response to the received spread spectrum signal when it is able to match the chip sequence to a sufficient degree. To do so, the receiver generates the same pseudo-random chip sequence locally, synchronizes its chip sequence to the received chip sequence, and tracks the signal by maintaining synchronization during transmission and reception of data.

The requirement of synchronization by the receiver has generally been a problem in the art. This requirement generally increases the difficulty of initially acquiring a spread spectrum signal, especially in a noisy environment, and also can cause difficulty in tracking and/or maintaining spread spectrum communication after established. Synchronization and tracking requirements often translate into additional circuit complexity at the receiver and increased cost, and may impose operational constraints on the communication system. For example, the extra time required to achieve synchronization can degrade the efficiency of the communication system, and may be detrimental in systems requiring very rapid establishment of a communication link.

Data transmitted over air links or other transmission media may suffer from noise, interference, multipath fading, and similar effects which degrade or corrupt the integrity of the transmitted data. When direct sequence spread spectrum techniques are used to transmit data, these effects may cause one or more chips to be received in error or otherwise misidentified. Such errors can cause misidentification of the spread spectrum code or code segment sent and thus cause errors in recovering the transmitted data.

In view of the problems in the art, it would be advantageous to have a spread spectrum communication system in which the receiver may despread and demodulate the transmitted spread spectrum signal without the use of a locally generated copy of the chip sequence, and without the need for synchronizing the locally generated copy with the transmitter. It would further be advantageous to provide an efficient method for despreading spread spectrum signals without the need for synchronization, wherein a relatively large selection of orthogonal spread spectrum codes or other codes are available for communication. It would further be advantageous to have such a system wherein errors in transmission or reception may be rapidly and easily corrected.

SUMMARY OF THE INVENTION

The invention in one aspect provides a spread spectrum transmitter and method for transmission of spread spectrum signals. In one embodiment of the invention, a spread spectrum transmitter for generating a plurality of spread spectrum codes comprises a shift register having a plurality of stages. A plurality of tap sets are connected to selected stages of the shift register. Each tap set defines a different spread spectrum code, which may be maximal or non-maximal. Outputs from each tap set are provided to a code selector which selects one of the spread spectrum codes for transmission. The selected code is fed back into the shift register. The transmitter preferably receives a serial data stream, clocks the serial data into a first register, transfers the contents of the first register in parallel into a second register, and uses the contents of the second register to select the desired spread spectrum code.

The invention in another aspect generally provides a spread spectrum system in which the receiver decodes a spread spectrum signal without the need for a locally generated copy of the chip sequence used by the transmitter to encode the signal, and without the need for synchronizing the receiver with the transmitter. In one embodiment, a receiver delays an incoming spread spectrum signal using a plurality of delay lines (e.g., two delay lines for a code sequence generated with two feedback taps on a shift register), and the signal and its delayed versions are multiplied and filtered to recover the original data. In a preferred embodiment, the delay imposed by each delay line is small compared with a single data bit transmission time.

In another embodiment, the data is encoded by the transmitter to account for delays at the receiver which are not small compared with a single data symbol transmission time (e.g., more than one chip time and less than one data symbol time). In this embodiment, the receiver may impose delays which are not small compared with a single data symbol transmission time, and may recover the data by multiplication and filtering to reverse the preparation step performed at the transmitter.

In another embodiment, a carrier for the spread spectrum signal is recovered by operation of the receiver. The carrier signal is used to demodulate information imposed on the original carrier. In a particular version of this embodiment, at least part of the original data may be encoded using a selected chip sequence, which is non-inverted to indicate a "0" bit and inverted to indicate a "1" bit.

In another embodiment, a received signal is provided to a shift register or similar means having a plurality of taps matching the taps of a feedback shift register used to generate the spreading code in the transmitter. In a particular version of this embodiment, a plurality of sets of taps are coupled to a single shift register, whereby a plurality of M spreading codes may be recognized by the same shift register. The M spreading codes are preferably selected for minimal cross-correlation and maximal auto-correlation, whereby each one of M spreading codes represents a symbol having $\log_2(M)$ bits of data.

In another embodiment, an auto-synchronizing system allows recognition a spreading code very quickly, starting from the first received chip. In this embodiment, chips from a received spread spectrum signal are provided to a tapped shift register, which is preloaded with a predetermined code sequence. When a correct code sequence is received, the tapped signals are combined so as to yield a match signal starting within a relatively brief period (e.g., within one chip of its receipt).

In another aspect of the invention, an error correction method and apparatus is provided suitable for use in an auto-synchronizing correlator. A received set of chips is identified with a code sequence that has a minimal cross-correlation or maximal Hamming distance with other codes, whereby a received code sequence with imperfect correlation may be recognized as corresponding to a defined symbol. In a preferred version of this embodiment, a set of chip sequences with zero cross-correlation may be selected, whereby up to 8 erroneous chips in each set of 32 chips may be detected and up to 7 chips may be corrected.

In another embodiment, more than one data symbol is simultaneously transmitted using quadrature phase modulation, and may be recognized by the receiver. In general, a set of N symbols may be simultaneously transmitted and recognized by the receiver. With M spreading codes and N simultaneous symbols, a number of symbols proportional to $M^N$ may be simultaneously transmitted if the order of transmitting is preserved, or (M choose N) (i.e., the number of ways to choose N things from a set of M things) if the order of transmitting is not preserved.

BRIEF DESCRIPTION OF THE DRAWINGS

The various objects, features and advantages of the present invention may be better understood by examining the Detailed Description of the Preferred Embodiments found below, together with the appended Figures, wherein.

DESCRIPTION OF THE PREFERRED EMBODIMENTS

Inventions described herein may be made or used in conjunction with inventions described, in whole or in part, in the following patents or copending applications, each of which is hereby incorporated by reference as if fully set forth herein:

U.S. Pat. No. 5,016,255 issued in the name of inventors Robert C. Dixon and Jeffrey S. Vanderpool, entitled "Asymmetric Spread Spectrum Correlator";

U.S. Pat. No. 5,022,047 issued in the name of inventors Robert C. Dixon and Jeffrey S. Vanderpool, entitled "Spread Spectrum Correlator";

U.S. Pat. No. 5,285,469 issued in the name of inventor Jeffrey S. Vanderpool, entitled "Spread Spectrum Wireless Telephone System";

U.S. Pat. No. 5,291,516 issued in the name of inventors Robert C. Dixon and Jeffrey S. Vanderpool, entitled "Dual Mode Transmitter and Receiver";

U.S. Pat. No. 5,402,413 issued in the name of inventor Robert C. Dixon, entitled "Three Cell Wireless Communication System";

U.S. patent application Ser. No. 08/161,187, filed Dec. 3, 1993, in the name of inventor Robert C. Dixon, entitled "Method and Apparatus for Establishing Spread Spectrum Communication";

U.S. patent application Ser. Nos. 08/215,306 and 08/293,671 filed on Mar. 21, 1994 and Aug. 1, 1994, respectively, both in the name of inventors Gary B. Anderson, Ryan N. Jensen, Bryan K. Petch, and Peter O. Peterson, and both entitled "PCS Pocket Phone/ Microcell Communication Over-Air Protocol";

U.S. patent application Ser. No. 08/293,671, filed Aug. 18, 1994, in the name of inventors Robert C. Dixon, Jeffrey S. Vanderpool, and Douglas G. Smith, entitled "Multi-Mode, Multi-Band Spread Spectrum Communication System"; and U.S. patent application Ser. No. 08/304,091, filed Sep. 9, 1994, in the name of inventors Randy Durrant and Mark Burbach, entitled "Coherent and Noncoherent CPM Correlation method and Apparatus."

Figure 1:
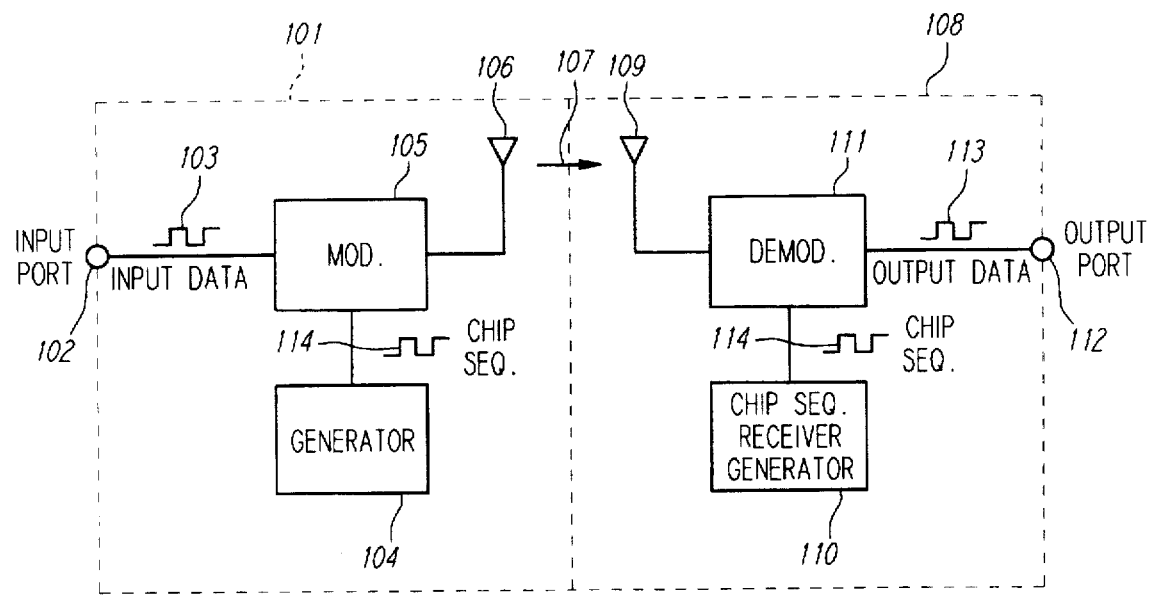
FIG. 1 is a block diagram of a spread-spectrum communication transmitter and receiver as is known in the art.

FIG. 1 is a block diagram of a spread-spectrum transmitter and receiver as known in the art.

In FIG. 1, a spread-spectrum transmitter 101 comprises an input port 102 for providing input data 103, a chip sequence transmitter generator 104, a modulator 105, and a transmitting antenna 106 for transmitting a spread-spectrum signal 107. A spread-spectrum receiver 108 comprises a receiver antenna 109, a receiver chip sequence generator 110, a demodulator 111, and an output port 112 for output data 113. The spread-spectrum signal 107 may be transmitted over an RF transmission channel, but could also by transmitted over other transmission media, such as modulated laser, ultrasound, or fluidic systems.

In operation, a chip sequence 114 is identically generated by both the transmitter generator 104 and the receiver generator 110, and appears essentially random to others not having knowledge of the chip sequence 114. The transmitter generator 104 may comprised a shift register configured with feedback taps for generating a particular spreading sequence. The receiver multiplies the incoming spread spectrum signal against its locally generated chip sequence 114 so as to despread the encoded signal. In doing so, the receiver attempts to properly align the locally generated chip code with the incoming signal. Such alignment generally requires synchronization of the incoming signal by, for example, transmission of an initial preamble, or by use of a sliding correlator until sufficient match is achieved. An extensive discussion of spread-spectrum communication, spreading codes, chip sequences, and synchronization techniques may be found in R. Dixon, *Spread Spectrum Systems with Commercial Applications* (J. Wiley & Sons, 3d ed. 1994).

Figure 2A:
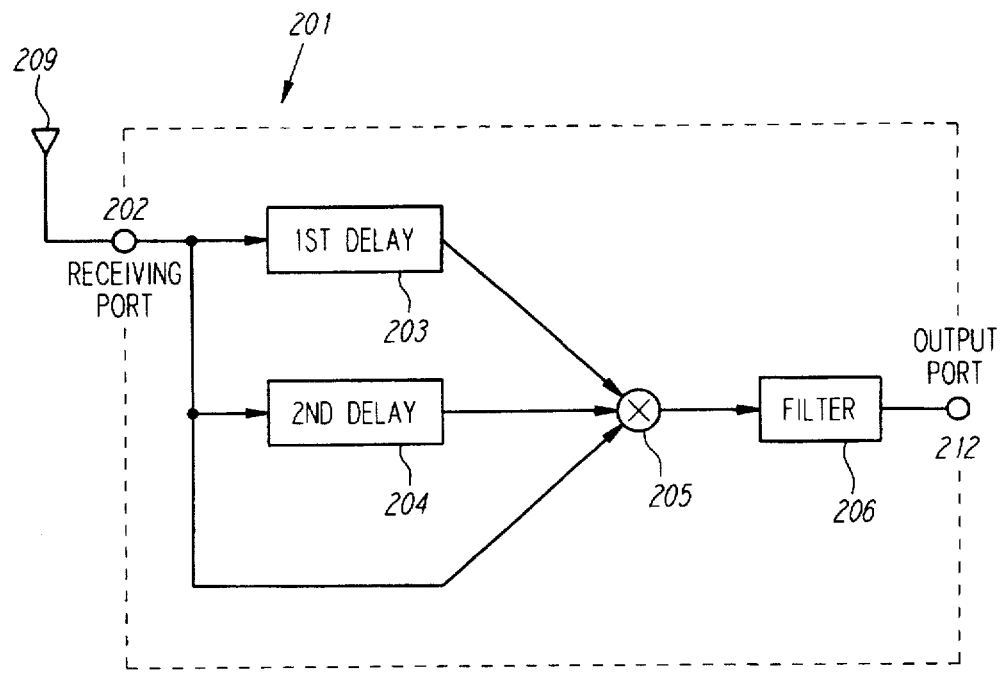
FIG. 2A is a block diagram of an embodiment of a spread-spectrum receiver in accordance with one or more aspects of the present invention.

FIG. 2A is a block diagram of a spread-spectrum receiver in accordance with one or more aspects of the present invention.

As shown in FIG. 2A, a receiver 201 comprises a receiving port 202 coupled to a receiver antenna 209. The receiver antenna 209 may include circuitry for amplification, filtering and/or frequency translation as desired. The receiving port 202 is coupled to a first delay 203 and to a second delay 204. Although FIG. 2A shows the first delay 203 and the second delay 204 coupled in parallel to the receiving port 202, one of the first delay 203 and the second delay 204 will be longer than the other, so that the second delay 204 may be coupled to an output of the first delay 203, or vice versa. The first delay 203 and the second delay 204 may comprise, for example, one or more surface acoustical wave (SAW) devices or other suitable delay elements.

The receiving port 202, the first delay 203 and the second delay 204 are coupled to a multiplier circuit 205. The multiplier circuit 205 may physically comprise two multipliers, a first multiplier for combining the output of the first delay 203 and the second delay 204, and a second multiplier for combining the receiving port 202 and an output of the first multiplier to produce an output of the multiplier circuit 205. In one embodiment, the delay period of the first delay 203 is set equal to a number of chips in a feedback shift register code generator in the transmitter between a first position and a first tap, and the delay period of the second delay 204 is set equal to a number of chips in the feedback shift register code generator between the first chip position and a second tap. Other delay periods may also be suitable, as further described herein.

The output of the multiplier circuit 205 is coupled to a filter 206. The filter 206 is coupled to the output port 212 of the receiver 201. The receiver 201 need not have any chip sequence generator 110 such as shown in FIG. 1.

In operation, the transmitter (e.g., such as transmitter 101 of FIG. 1) generates a carrier waveform which has been phase modulated (e.g., biphase modulated) with the chip sequence 114 and the input data 103 at a chipping rate which is higher than a data rate. The chip sequence 114 preferably comprises a maximal linear pseudo-random binary sequence. The input data 103 may also be phase-shift keyed (PSK).

Operation of the receiver 201 is based in part on a property of maximal linear binary sequences that the modulo-two sum of such a sequence with a delayed version of itself is a second delayed version of the same sequence. The amount of the second delay depends upon the particular maximal linear binary sequence. In the FIG. 2A embodiment, a carrier which has been modulated with a maximal linear sequence is processed in the receiver 201 to develop three time-distinct sequences. The three time-distinct sequences are multiplied together to generate a product having an original carrier frequency component and a third harmonic of the carrier frequency. By filtering, the third harmonic of the product is recovered with the phase modulation removed.

These principles may be further explained as follows. Let t=time, s(t) be the spread-spectrum signal 107, a(t) be a maximal linear binary sequence, and ω be the carrier frequency. First without considering transmitted data, the spread spectrum signal 107 modulated by a carrier signal may be represented as follows:

$$s(t)=a(t)\cos(\omega t) \qquad (251)$$

where a(t) is considered to be a sequence of +1 and −1 values. The a(t) signal may also be represented as a sequence of +1 and 0 values, instead of +1 and −1 values.

Let R=chipping rate, j=first delay in chips, k=second delay in chips, $a_j(t)=a(t)$ delayed by j chips, and $a_k(t)=a(t)$ delayed by k chips. Due to the time-shifting effect of modulo-two addition with respect to a maximal linear sequence and a delayed version thereof described above, the chip sequence a(t) modulo-two added with a time-shifted version of itself delayed by j chips results in a second time-shifted version of itself delayed by k chips. Thus:

$$a_k(t)=a(t)+_{mod2}a_j(t) \qquad (252)$$

where a(t) is considered to be a sequence of +1 and 0 values, and the symbol $+_{mod2}$ refers to modulo-two addition.

Equivalently, all three sequences sum (modulo-two) to the sequence of all zeros:

$$a(t) +_{mod2} a_j(t) +_{mod2} a_k(t) = 0 \tag{253}$$

Restating equation 251 for the delayed versions of a(t), $$s(t+j/R) = a(t+j/R) \cdot \cos(\omega t + \omega j/R) \tag{254}$$

$$s(t+k/R) = a(t+k/R) \cdot \cos(\omega t + \omega k/R) \tag{255}$$

where j/R and k/R represent time delays or phase shifts.

The output of the multiplier 205 may be expressed in terms of the relationships derived above. Thus, the output of multiplier 205 is a product of the three time-distinct versions of s(t):

$$s(t) \cdot s(t+j/R) \cdot s(t+k/R) = \cos(\omega t) \cdot \cos(\omega t + \omega j/R) \cdot \cos(\omega t + \omega k/R) \tag{256}$$

Phase modulation (e.g., biphase modulation) resulting from spread spectrum encoding is removed using multiplier 205 because, as noted in equation 253, $a(t) +_{mod2} a_j(t) +_{mod2} a_k(t) = 0$, or equivalently, where the sequences are represented by a series of +1 and −1 values (instead of 1 and 0 values), the product of the three sequences $a(t) \cdot a_j(t) \cdot a_k(t)$ is the sequence consisting of all "1"s. Expanding equation 256:

$$\cos(\omega t) \cdot \cos(\omega t + \omega j/R) \cdot \cos(\omega t + \omega k/R) = \tag{257}$$

$$(\tfrac{1}{2})[\cos(\omega j/R) + \cos(2\omega t + \omega j/R)] \cdot \cos(\omega t + \omega k/R) =$$

$$(\tfrac{1}{4})\cos(\omega j/R - \omega t - \omega k/R) + (\tfrac{1}{4})\cos(\omega j/R + \omega t + \omega k/R) +$$

$$(\tfrac{1}{4})\cos(\omega j/R + \omega t - \omega k/R) + (\tfrac{1}{4})\cos(3\omega t + \omega j/R + \omega k/R)$$

The output of multiplier 205 therefore has a frequency component at ω and a frequency component at 3ω. To obtain the 3ω component of equation 257, the output of multiplier 205 is connected to filter 206, which may comprise a bandpass filter centered at 3ω which attenuates or removes the ω component. The output of the filter 206 then becomes:

$$(\tfrac{1}{4}) \cos(3\omega t + \omega j/R + \omega k/R) \tag{258}$$

Alternatively, the filter 206 may be configured to pass the ω frequency components of equation 257. However, because there are three phase-offset ω frequency components as opposed to a single carrier signal without a phase offset (such as the 3ω component), additional processing steps or filtering may be required as part of the data recovery process in such a case.

A data signal d(t) may be sent as part of the transmitted signal in analog form or as binary data. Data may also be sent in a coded manner using a plurality of symbol codes, wherein a given symbol code represents a unique sequence of data bits as further described herein. Generally, a relatively large number of chips is used to transmit a single data bit or data symbol—that is, the chipping rate is often much higher than the data rate.

In one embodiment, the selection of values for j and k is related to the duration of a data bit or data element sent as part of the data signal d(t). Because the values of j and k are not unique for which the equation $a(t) +_{mod2} a_j(t) +_{mod2} a_k(t) = 0$ (equation 253) is true, the values of j and k may be selected from a set of possible j and k values so that j and k are small relative to a single data bit transmission time. If so chosen, then, at the receiver 201 of FIG. 2A, the value of each data bit or data element (e.g., either +1 or −1) for each of the three duplicate but phase-distinct chip sequences a(t), $a_j(t)$, and $a_k(t)$ is the same over most of the duration of a data bit. Upon multiplication of the three duplicate chip sequences, the received data bits (either +1 or −1) are essentially cubed by the multiplier 205, and their value is therefore left unchanged.

This effect may be explained in more detail as follows. Letting the input signal 103 be represented as data signal d(t), then the received signal and the delayed replicas thereof may be represented as:

$$s(t) = d(t) \, a(t) \cos(\omega t) \tag{260}$$

$$s(t+j/R) = d(t+j/R) \, a(t+j/R) \cos(\omega t + \omega j/R) \tag{261}$$

$$s(t+k/R) = d(t+k/R) \cdot a(t+k/R) \cdot \cos(\omega t + \omega k/R) \tag{262}$$

After operation of both the multiplier 205 and the filter 206 configured to pass 3ω frequency components, the output is:

$$(\tfrac{1}{4}) \, d(t) \cdot d(t+j/R) \cdot d(t+k/R) \cdot \cos(3\omega t + \omega j/R + \omega k/R) \tag{263}$$

Because j and k are small as compared with a single data bit transmission time, the output of the filter 206 may be approximated:

$$d(t) \cdot d(t+j/R) \cdot d(t+k/R) = [d(t)]^3 = d(t) \tag{264}$$

Thus, the original data signal d(t) is essentially recovered free from the spreading code a(t). The data signal d(t) may then be processed to recover data information by any suitable means as is known in the art.

Figure 2B:
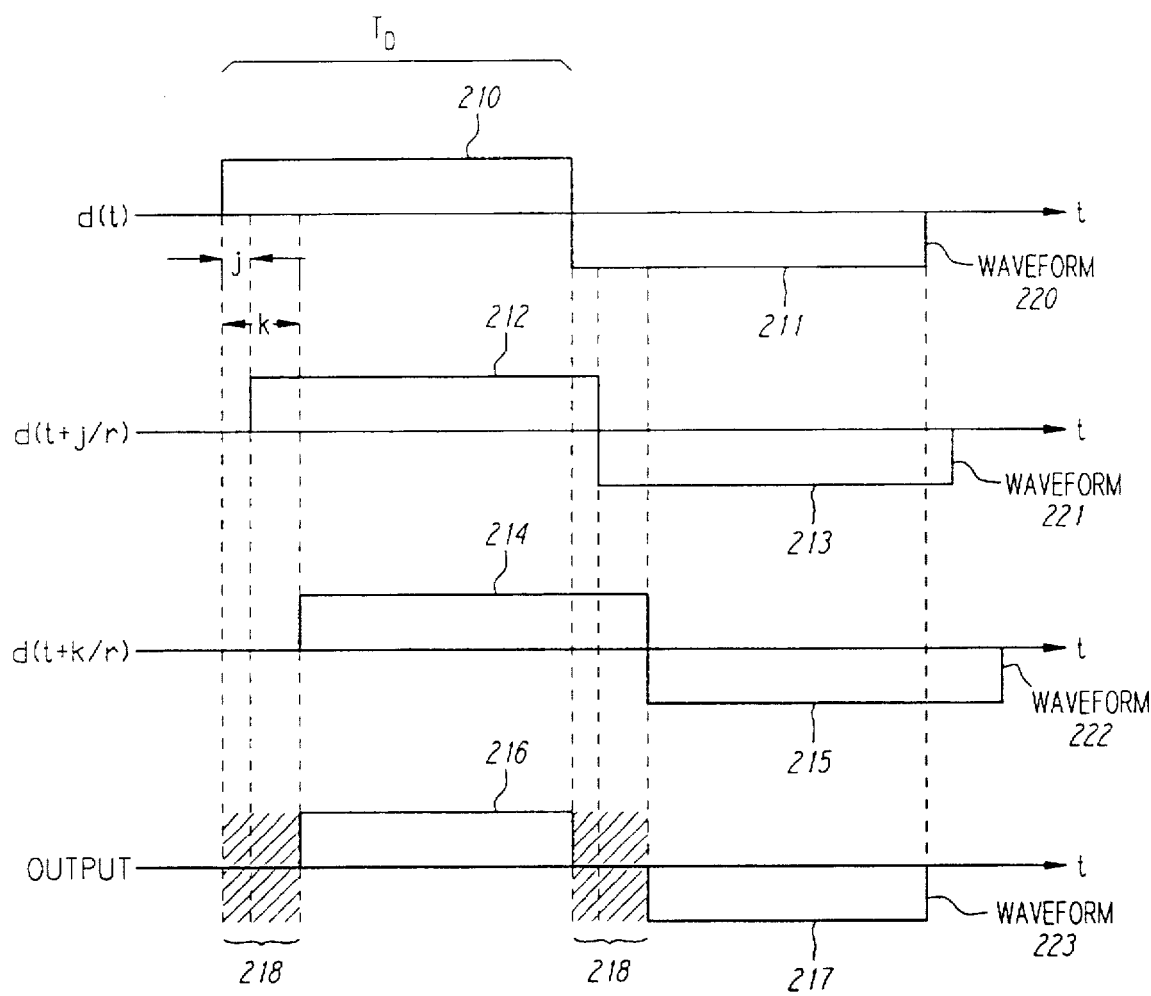
FIG. 2B is a graph of exemplary waveforms in accordance with the embodiment of FIG. 2A.

FIG. 2B is a graph of exemplary waveforms (without the carrier signal) in accordance with the FIG. 2A embodiment. Waveform 220 represents data signal d(t) having a first data element 210 such as +1 and a second data element 211 such as −1. Waveform 221 represents data signal d(t) delayed by j chips. Waveform 222 represents data signal d(t) delayed by k chips. Waveform 223 represents a result of multiplying waveforms 220, 221 and 222 together, and generally corresponds to the output of multiplier 205 shown in FIG. 2A.

As shown in FIG. 2B, if j and k are small enough, then data elements 210, 212 and 214 will line up in time such that the output waveform 223 will comprise the same data element 216 for substantially a full data element duration. Likewise, data elements 211, 213 and 215 will line up in time such that the output waveform 223 will comprise the same data element 217 for substantially a full data bit duration. Brief periods 218 between data elements 216 and 217 in the output waveform 223 occur during which the value of the output waveform 223 is indeterminate. These periods 218 correspond to the periods defined by j and k. However, as j and k delays are relatively small, the indeterminate periods 218 are short, and the data can be recovered by demodulating and low pass filtering the output signal to eliminate the higher frequency components present in the indeterminate periods 218.

In one embodiment, the input data 103 d(t) may be pre-encoded at the transmitter 101 as d'(t) so that it is properly decoded by operation of the multiplier 205 and the filter 206. In such an embodiment, it is not necessary to select the delays j and k which are small compared with a single data bit or data element transmission time. Rather, because the values of R, j and k are known, the transmitter may compute from d(t) the coded data d'(t) such that:

$$d(t) = d'(t) \cdot d'(t+j/R) \cdot d'(t+k/R) \tag{265}$$

is true for all t. At the receiver, the signal is decoded by the operations previously described to recover d(t) from d'(t).

In a particular embodiment, the number of delay elements (such as delays 203 and 204) is related to the number of taps in a transmitter shift register. Thus, for example, two delays 203 and 204 could be used where a transmitted code sequence is generated in the transmitter by use of a tapped shift register feeding back two taps. If more than two taps are fed back in the transmitter, additional delay elements are used in the receiver in order to despread the received signal. Thus, a shift register with three feedback taps would require three delay elements in the receiver, a shift register with four feedback taps would require four delay elements in the receiver, and so on. In this embodiment, the delay period for each delay element equals a number of chips between the first chip of the transmitter shift register and the corresponding tap position on the transmitter shift register. Thus, for a 13-stage, four-tap transmitter shift register having feedback taps at chip positions 1, 3, 4 and 13, four delay elements are used in the receiver; the delay elements have associated delay periods of 1 chip, 3 chips, 4 chips, and 13 chips, respectively. Upon receiving a signal, the four delay elements output four delayed replicas of the input signal. The four delayed replicas are combined with the received signal in order to despread the received signal.

In another embodiment, where the code transmitted is a maximal linear sequence, the receiving shift register uses only two delay elements regardless of the number of feedback taps used to generate the maximal linear code in the transmitter shift register. The delays in such a case may be longer than the total length (in chips) of the transmitter shift register. Thus, for example, if the transmitter comprises a 10-stage feedback shift register having four feedback taps, and is configured so as to generate a maximal linear code, then a receiving shift register with two taps can be longer than 10 stages in order to recognize and despread the transmitted code sequence.

Figure 2C:
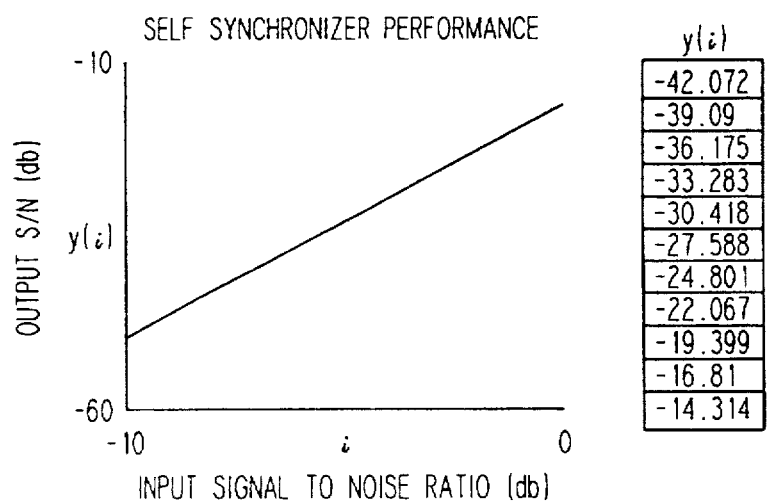
FIG. 2C is a plot of input and output signal/noise ratios for the receiver of FIG. 2A.

FIG. 2C is a plot of the input and output signal/noise ratios of the receiver shown in FIG. 2A. The signal/noise ratio is given as follows. Let $SN_i$=input signal/noise ratio and $SN_o$= output signal/noise ratio. Then:

$$SN_o = SN_i^3/(3 SN_i^2 + 9 SN_i + 15) \quad (301)$$

The degradation in the output signal/noise ratio indicated by the above equation is the result of the nonlinear operation of the multiplier 205 in multiplying the three time-distinct versions of the spread-spectrum signal 107 at a relatively low signal/noise ratio. The output signal/noise ratio will degrade further where more than two delay elements are used. This reduction in signal/noise ratio is preferably made up for by the processing gain of the rest of the spread-spectrum communication system.

While the previous discussion has focused on the reception an demodulation of individual data bits, similar principles may apply to the reception and demodulation of data symbols and symbol codes. In particular, in a preferred embodiment, each of $2^N$ symbol codes represents a unique series of N data bits. Thus, a total of 32 symbol codes is required to represent five data bits. Each symbol code may comprise a maximal linear sequence of predefined length, such as 31 chips. A data stream to be transmitted may be broken into segments of five bits. For each five-bit segment, a corresponding symbol code is transmitted. This technique is referred to as M-ary spread spectrum communication, where M represents the number of possible data symbols that can be represented or transmitted at a particular time. For example, where any one of 32 symbol codes may be selected for transmission, each symbol code representing one of 32 5-bit data segments, then the communication technique may be referred to as a 32-ary communication technique.

As an example, if M=2, then two spread spectrum codes are used, and the system may be referred to as a 2-ary system. One spread spectrum code is transmitted for each mark or 1-bit in the data stream, and another second spread spectrum code is transmitted for each space or 0-bit in the data stream.

If multiple code sequences are transmitted (for example, M different code sequences) in conjunction with an M-ary spread spectrum communication technique, then M receivers 201 may operate in parallel to recover data from the transmitted signal. In such a parallel structure, each of the M receivers is configured to recognize a different one of the M code sequences. A received signal is provided to all of the M receivers 201 simultaneously. Upon recognizing the code sequence to which it is matched, a particular receiver 201 outputs an RF signal. The outputs from each of the receivers 201 may be monitored, and receipt of an RF signal from a particular receiver 201 thereby indicates receipt of the data symbol to which the receiver 201 is attuned. The particular data bits represented by the data symbol may be recovered when the data symbol is recognized.

Figure 3A:
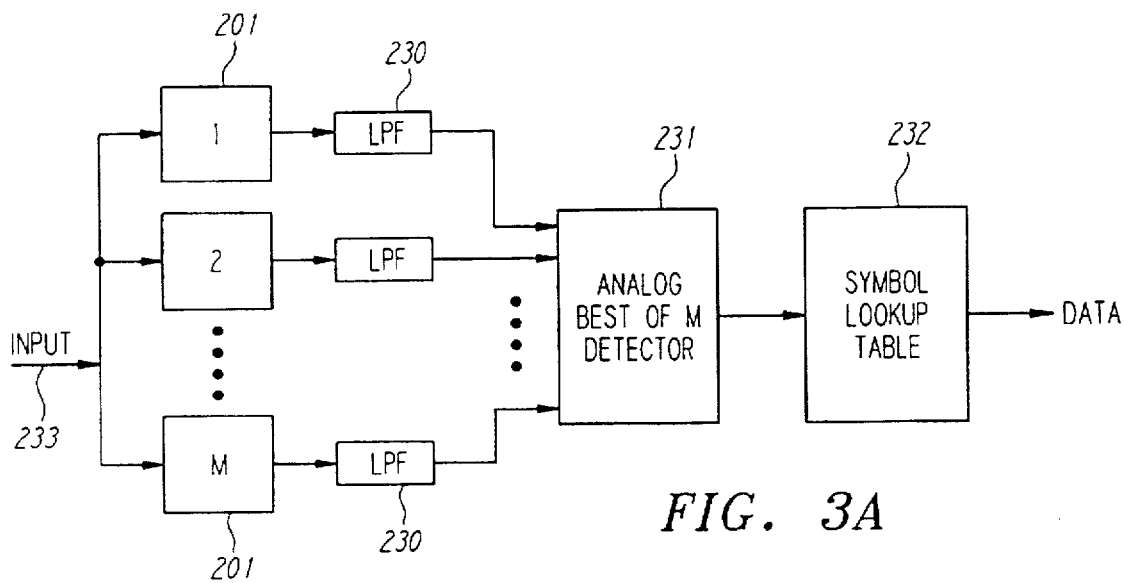
FIG. 3A is an embodiment of a parallel receiver structure for simultaneously recognizing multiple spreading codes.

A block diagram of a set of receivers 201 operating in parallel is shown in FIG. 3A. An incoming signal 233 is provided to each of the receivers 201. An output from each of the receivers 201 is provided to a plurality of low pass filters 230, one for each receiver 201. The low pass filters 230 are connected to an analog best-of-M detector 231, which compares the outputs from each of the low pass filters 230 and selects the one with the strongest RF signal output. The best-of-M detector 231 is coupled to a symbol lookup table 232, which outputs a data symbol corresponding to the strongest signal received from the receivers 201.

The above system of M parallel receivers 201 may also be used outside of an M-ary system. Each of the M receivers 201 may be configured to recognize a different code sequence. When a particular receiver 201 recognizes the code sequence for which it is configured, the receiver 201 may be selected for receiving communication during that time. The RF output for the particular receiver 201 may be demodulated by conventional techniques to recover the information modulated on the carrier signal.

Figure 3B:
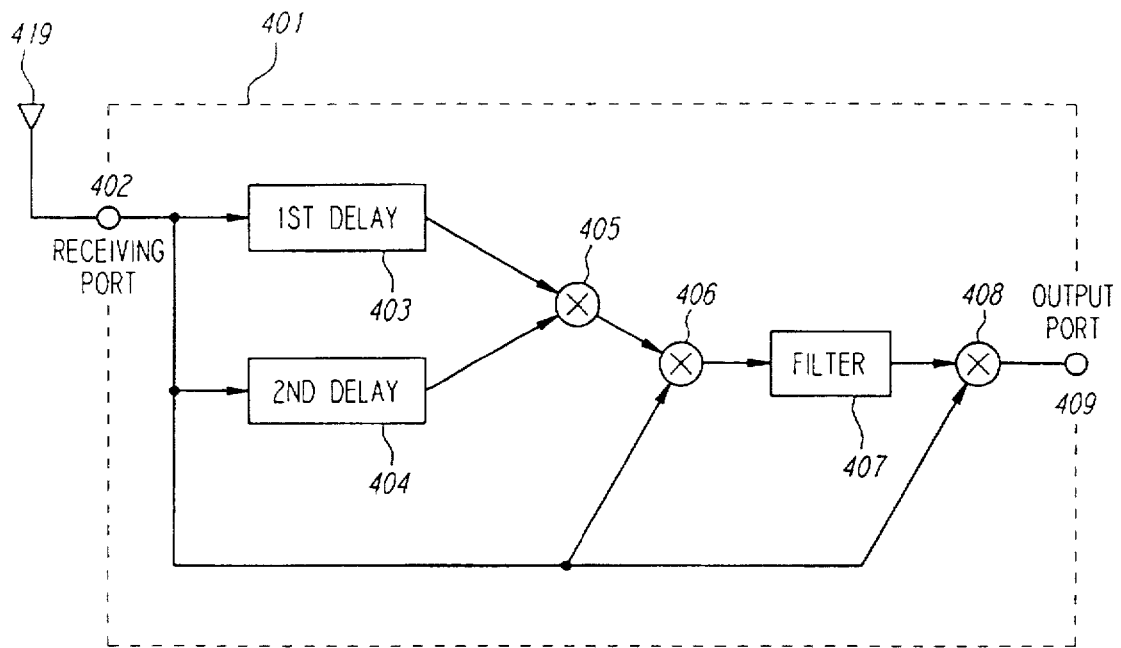
FIG. 3B is a block diagram of an alternative embodiment of a receiver in accordance with one or more aspects of the invention, wherein the underlying carrier waveform is demodulated to obtain data modulated thereon.

FIG. 3B is a block diagram of an embodiment of a receiver in accordance with certain aspects of the present invention. In the FIG. 3B embodiment, the spread spectrum signal 107 is modulated with data $d_1(t)$, plus the underlying carrier waveform is also modulated with data $d_2(t)$. For example, if the spread-spectrum signal 107 is modulated with one of four spread spectrum codes, it may convey up to two bits of data per code; if the underlying carrier waveform is also modulated by means of 4-ary frequency-shift keying (FSK), it may also convey up to two bits of data per modulation, for a total of four bits of data.

In FIG. 3B, a receiver 401 comprises a receiving port 402 coupled to a receiver antenna 419. The receiver antenna 419 may comprise circuitry for amplification, filtering and/or frequency translation as desired. The receiving port 402 is coupled to a first delay 403 and to a second delay 404, configured either in parallel or in series, as noted with regard to FIG. 2A.

The first delay 403 and the second delay 404 are each connected to an input of a multiplier circuit 405. The receiving port 402 and the output of the multiplier circuit 405 are coupled to another multiplier circuit 406. The output of the multiplier circuit 406 is coupled to a filter 407. The receiving port 402 and the filter 407 are coupled to a third multiplier circuit 408 for demodulating the carrier waveform. The third multiplier circuit 408 may be coupled to an output port 409 of the receiver 401.

Operation of the FIG. 3B receiver 401 is as follows. A transmitted spread spectrum signal s(t) is received by the antenna 419 and provided to the input port 402. The received signal s(t) is delayed by the first delay 403 and the second delay 404. A signal g(t) is produced by multiplier 405, which multiplies the two phase-delayed copies of the received spread-spectrum signal:

$$g(t)=s(t+j/R) \cdot s(t+k/R) \quad (401)$$

Assuming that j and k are small (and therefore that $d(t+j/R) \cdot d(t+k/R) \approx (\pm 1)^2 = 1$), then the signal g(t) has a component $g_1(t)$ which comprises twice the input carrier frequency modulated by a chip code a(t), $$g_1(t)=a(t)\cos(2\omega t+(j+k)(\omega/R)) \quad (412)$$

and a component $g_2(t)$ which comprises a DC component multiplied with the same chip code a(t), $$g_2(t)=-a(t)\cos((j-k)(\omega/R)) \quad (413)$$

When multiplied by the received spread-spectrum signal s(t), the original carrier waveform and a third harmonic are recovered with various phase offsets, $$s(t)g(t) = d(t) [\cos(3\omega t + (j + k) (\omega/R)) - \quad (414)$$
$$\cos(\omega t + (j + k) (\omega/R)) - \cos(\omega t + (j - k) (\omega/R)) +$$
$$\cos(\omega t - (j - k) (\omega/R))]$$

The signal of equation 414 is filtered by filter 407 to recover the carrier waveform. The received signal from the receiving port 402 and the recovered carrier waveform output from filter 407 are multiplied together so as to demodulate the carrier waveform.

Figure 4C:
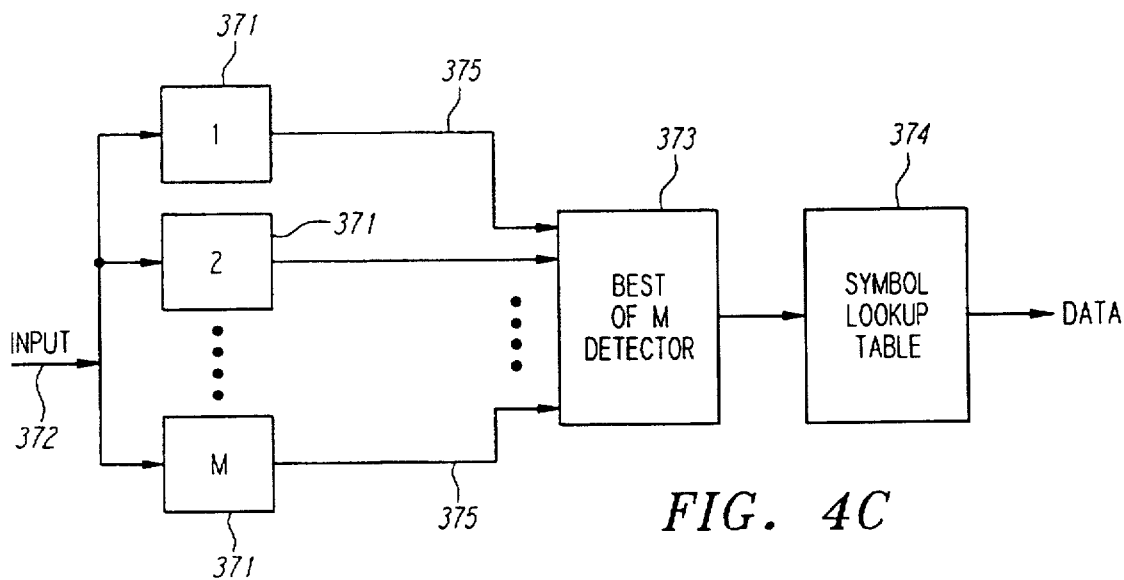
FIG. 4C is an embodiment of a parallel receiver structure for simultaneously recognizing multiple spreading codes.
Figure 4A:
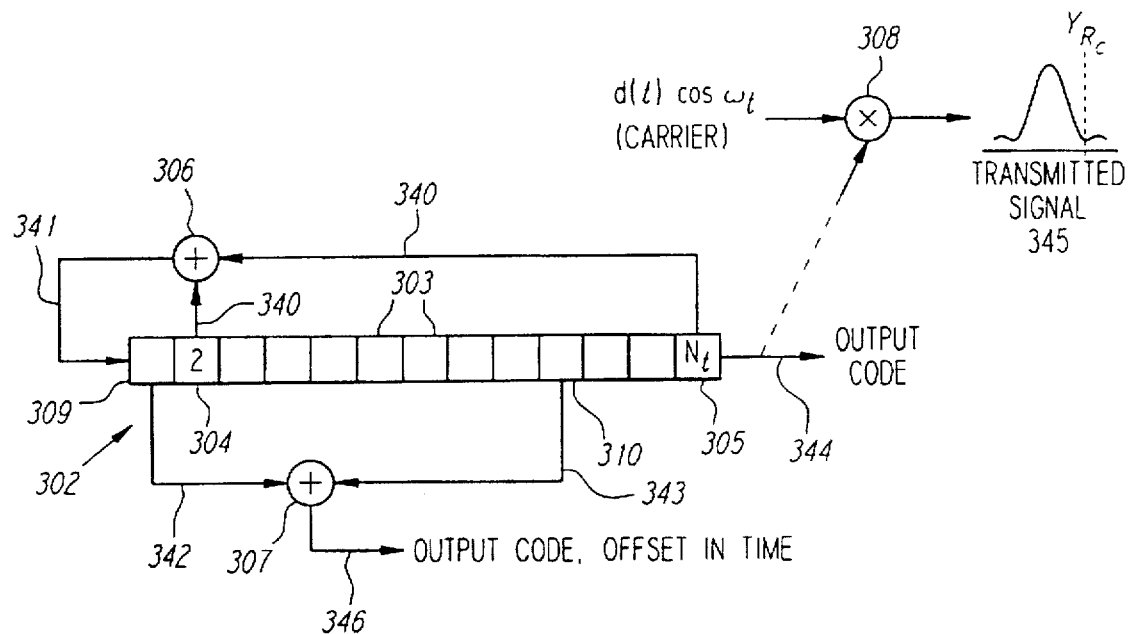
FIG. 4A is a block diagram of a spread spectrum code generator using a linear feedback shift register.
Figure 4B:
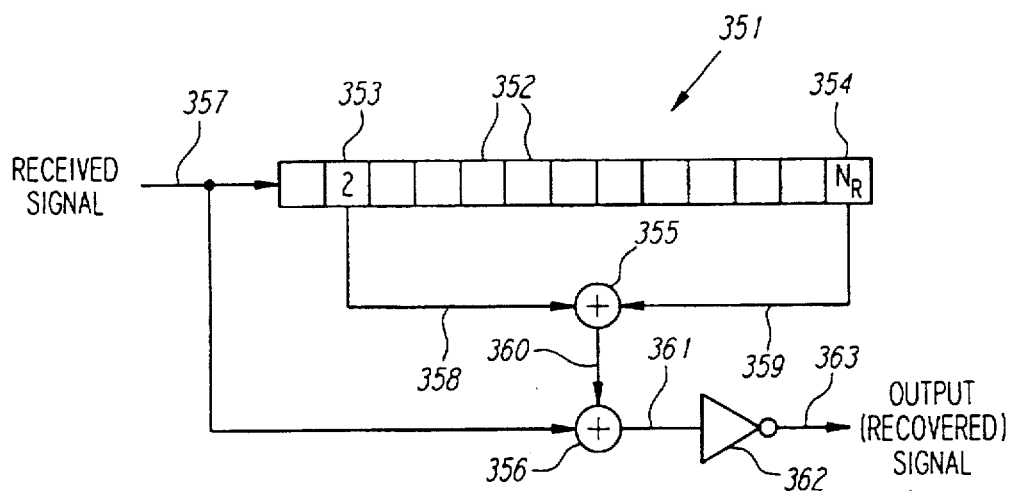
FIG. 4B is a diagram of a tapped shift register in a receiver for despreading a received spread spectrum code.

FIGS. 4A and 4B illustrate an embodiment of the present invention using tapped shift registers.

FIG. 4A is a block diagram of a binary sequence generator comprising a tapped shift register 302 with feedback connections. The tapped shift register 302 has a plurality of delay stages 303, such as, for example, $N_t$ delay stages. The tapped shift register 302 may therefore hold up to $N_t$ chips at a given time.

The tapped shift register 302 is configured with a plurality of taps (e.g., two taps 340) to provide feedback for code generation. Taps 340 from selected stages 304, 305 are input to an exclusive-OR logic gate 306 which performs a modulo-2 additive operation on the chips in stages 304 and 305. The output of the exclusive-OR logic gate 306 is fed back to the input of the tapped shift register 302. If the feedback taps 240 of the tapped shift register 302 correspond to a linear maximal code sequence, then the output code 344 will also be a linear maximal code sequence.

The spread spectrum code sequence generator of FIG. 4A may be incorporated in a transmitter and used to generate a code sequence for modulating a data signal d(t). The signal to be transmitted may be mixed with a carrier signal by a multiplier 308 to generate a transmitted spread spectrum signal 345. Further discussion of tapped shift registers and their relationship to the generation of linear and nonlinear maximal code sequences may be found in the text *Spread Spectrum Systems with Commercial Applications* cited above, from which pages 62–105 and 485–503 are provided as a Technical Appendix filed herewith and incorporated by reference as if fully set forth herein. No admission of possible prior art effect is made with respect to the materials in the Technical Appendix.

FIG. 4A also illustrates a technique for generating a phase-shifted version of a linear maximal code sequence. A code sequence signal 342 appearing at a delay stage 309 at a selected point along the tapped shift register 302 (e.g., j stages) is provided as one input of an exclusive-OR logic gate 307. A code sequence signal 343 appearing at a delay stage 310 at a point further along in the tapped shift register 302 (e.g., k stages) is also provided as an input to the exclusive-OR logic gate 307. The inputs to the exclusive-OR logic gate 307 thus comprise a pair of code sequences, one delayed by j chips, and the other by k chips. The output 346 of the exclusive-OR gate 307 comprises the same code sequence as the output 344, but offset in chips (and therefore offset in time).

Similarly, as a property of linear maximal sequences, any two stages 303 tapped and combined in such a manner will produce the same code sequence as output 344, but offset in chips from the original code. By appropriately choosing the locations of the two stages 309 and 310, the values of j and k may be selected in the transmitter. Accordingly, values of j and k may be selected in the transmitter so as to satisfy equation 265 for all t, based on the selection of tap locations.

If a desired value (up to L chips, where L is the number of chips in the code sequence) for j or k is greater than the number of stages in the tapped shift register 302, then the j or k signal may be derived using the same technique. For example, to generate a k signal where k is longer than N, the k signal, which is simply a delayed version of the code sequence, may be obtained by combining an output from each of selected stages 303 using an exclusive-OR gate (such as exclusive-OR gate 307). More generally, an arbitrarily delayed version of the code sequence may be obtained by modulo-2 adding the outputs of up to $N_t$ selected delay stages 303. The k signal may then be combined with the j signal to generate a new maximal code having the desired delay relative to the original maximal code.

FIG. 4B is a diagram of a tapped shift register 351 at the receiver. The tapped shift register 351 has a plurality of delay stages 352, such as, for example, $N_R$ delay stages. A received signal 357 is coupled to the tapped shift register 351. The received signal may first be downconverted to a baseband frequency and/or digitized in upstream signal processing (e.g., by an analog-to-digital converter) prior to coupling to the tapped shift register 351. The received signal 357 over time propagates along the delay stages 352 of the tapped shift register 351. A signal 358 is tapped from a first selected stage 353, and another signal 359 is tapped from a second selected stage 354. The signals 358 and 359 are provided to the inputs of an exclusive-OR logic gate 355, the output 360 of which is coupled to the input of another exclusive-OR logic gate 356. The second exclusive-OR logic gate 356 also receives as an input the original received signal 357. The output 361 of the exclusive-OR logic gate 356 is coupled to an inverter 362, which produces an output signal 363.

The selected delay stages 353 and 354 may be chosen so as to be located j and k chips, respectively, from the receiving end of the register 351, thus meeting the criteria of equation 253 above. In operation, when a code sequence is received for which the tapped shift register 351 is not configured, then the output 363 comprises an essentially random pattern of "1"s and "0"s appearing much like noise. However, when a correct code is received, and after a delay period during which $N_R$ stages 352 of shift register 351 are filled by the received signal, the output 361 of the exclusive-OR logic gate 356 comprises a continuous stream of "0"s. The output signal 363 of the inverter 362 therefore comprises a continuous stream of "1"s when a correct code is received. The length the continuous stream is equal to the length L of the code minus the larger of delays j and k.

A low pass filter (not shown) may be connected to the output 363 in order to detect and respond to a continuous stream of "1"s An up-down counter may also be used to detect the stream of consecutive "1"s. In such a case, the up-down counter may be reset periodically (e.g., upon reaching a designated correlation value).

If a maximal linear code is transmitted, then only two taps are needed in the receiving shift register 351 to despread the signal, even though the transmitter shift register 302 may have more than two taps. If a non-maximal linear code is transmitted, then the receiving shift register 351 needs to have as many taps as the transmitter shift register 302 to despread the signal. Thus, use of non-maximal codes may degrade system performance as more taps are used and the number of corresponding non-linear multiplication operations required to despread the signal increases. As noted previously, each added non-linear multiplication operation may adversely impact the signal-to-noise ratio of the system. It is preferred to have no more than two taps in the receiving shift register 351.

The length of the receiving shift register 351 should be sufficient so as to allow tapping off sequences delayed by j and k chips. Where the transmitter shift register 302 is configured to generate a maximal linear sequence, then the receiving shift register 351 preferably has two taps, regardless of the number of taps used in the transmitter shift register 302, so as to keep the number of non-linear operations in the receiver to a minimum. However, the receiving shift register 351 may need to be longer than the transmitter shift register 302 when using more than two taps in the transmitter in order to accommodate potentially longer j and k delay periods. Alternatively, the maximal linear code may usually be chosen from among the set of all maximal linear codes such that its j and k is equal to or less than the number of stages 352 in the receiving register 351.

A plurality of the receivers shown in FIG. 4B may be used in parallel in a manner similar to that described with respect to FIG. 3A. FIG. 4C is a diagram of a parallel system in which a plurality of digital receivers 371 simultaneously receive an input signal 372. Each receiver 371 is configured to recognize one of a plurality (e.g., M) spread spectrum codes. Each receiver 371 outputs a correlation signal 375 indicative of a degree of match between chips of the input signal 372 and the spread spectrum code for which the receiver 371 is configured. Each correlation signal 375 comprises a sequence of "0"s (before inversion), and will be a sequence of all "0"s for a predetermined duration when a code is recognized. The correlation signals 375 are provided to a best-of-M detector 373, which chooses the correlation signal 375 having the highest number of matches (e.g., the greatest number of "0"s for a given set of received chips, or "1"s if using an inverter on the output of the correlation signal as shown in FIG. 4B). The best-of-M detector 373 provides a selection signal to a symbol lookup table 374, indicating which of 32 data symbols is to be selected based on the relative values of the correlation signals 375.

In a particular embodiment, a combination of M-ary and frequency shift keyed (FSK) transmission is used. Thus, at the transmitter, the spread-spectrum signal is modulated with data $d_1(t)$, and the underlying carrier waveform is also modulated with data $d_2(t)$. For example, if the carrier signal is modulated with one of four spread-spectrum codes, it may convey up to two bits of data per code; if the underlying carrier waveform is also modulated by means of 4-ary frequency-shift keying (FSK), it may also convey up to two bits of data per modulation, for a total of four bits of data.

Figure 5:
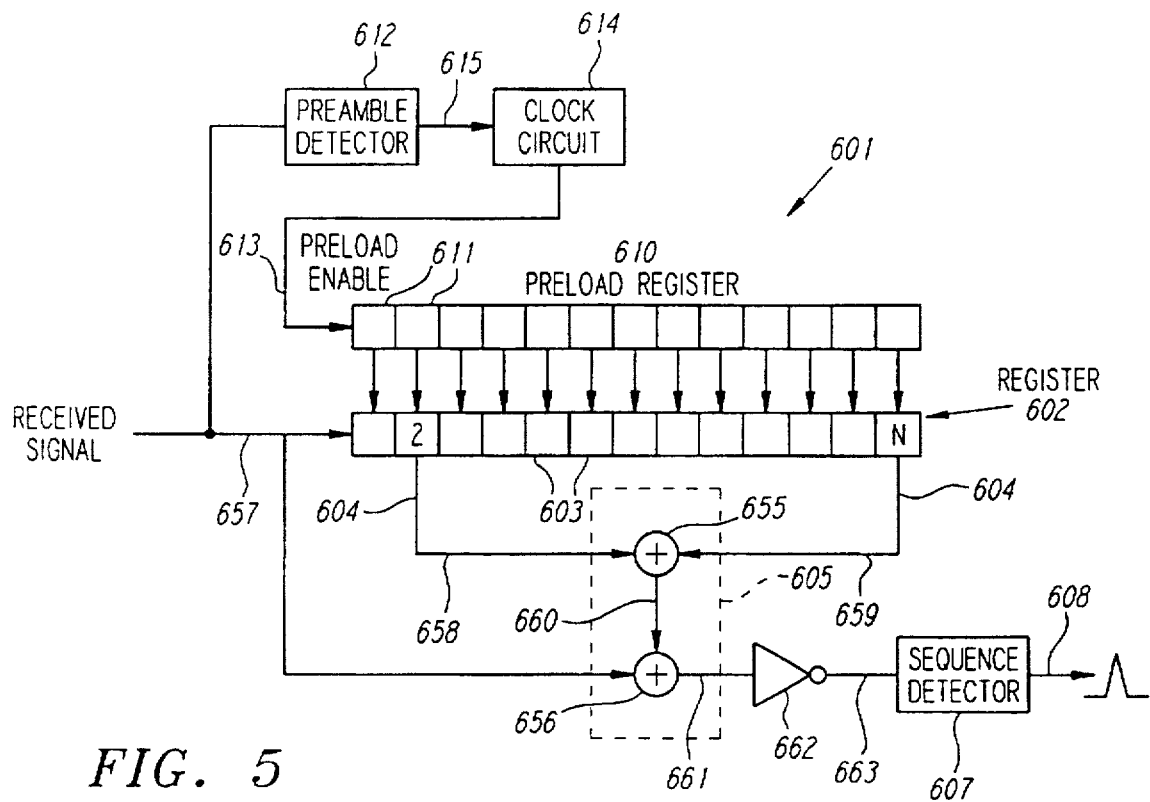
FIG. 5 is a block diagram of another embodiment of a spread spectrum receiver having a preloading capability for early detection of a spread spectrum code.

FIG. 5 is a block diagram of an embodiment of a spread spectrum receiver 601 capable of providing very rapid auto-synchronization.

In the receiver of FIG. 5, a received spread spectrum signal 657 is input to a tapped shift register 602. The tapped shift register 602 receives and stores a plurality of chips in delay stages 603. A set of taps 604 is connected to selected delay stages 603 of the tapped shift register 602. The taps 604 correspond to a designated spreading code to be recognized by the receiver.

Each of the taps 604 is connected to a modulo-two adder 605. The received signal 657 is also connected to the modulo-two adder 605, which combines its inputs and produce a match signal 661. In a preferred embodiment, the modulo-two adder 605 comprises a set of XOR logic gates 655, 656, each of which may produce a signal corresponding to the XOR of its inputs.

In a preferred embodiment, the receiver 601 is configured so that recognition of the portion of the code sequence occurs from the first chip of that code sequence, rather than waiting for $N_R$ chips to be received for the symbol to be recognized, where $N_R$ is the number of stages in the receiving shift register 602. This is accomplished by preloading the shift register 602 so as to cause the receiver to behave as if the previous $N_R$ chips have already been received and recognized. In such a case, the receiver 601 produces a continuous stream of either all "1"s or all "0"s (depending on whether or not the output correlation signal is inverted) immediately upon receiving the first chip of information, without the delay caused by waiting for an entire chip sequence to fill the tapped shift register 602. The length of the continuous stream will be equal to the length of the transmitted code sequence.

Means for preloading the tapped shift register 602 are shown in the receiver 601 of FIG. 5. A preload register 610 stores a preselected sequence of chips. In one embodiment, the contents of the preload register 610 are loaded into the tapped shift register 602 upon activation of a preload enable signal 613. The preload enable signal 613 may be activated in a number of different manners. For example, in one embodiment, a preamble detector 612 is employed to detect a preamble preceding a code sequence or set of code sequences to be recognized. The preamble may or may not be sent in spread spectrum format. The preamble detector 612 may comprise a non-coherent correlator such as described in U.S. patent application Ser. No. 08/304,091, previously cited herein, or may comprise a receiver such as shown in FIG. 4B, or may be any suitable preamble detector such as is known in the art.

When the preamble detector 612 detects a preamble, the preamble detector 612 sends a preamble detection signal 615 to a clock circuit 614. The clock circuit 614 activates the preload enable signal 613 periodically to control loading of the tapped shift register 602 from the preload register 610. For example, the clock circuit 614 may activate the preload enable signal 613 once per code sequence period, starting from the receipt of the preamble detection signal 615.

The same preamble detector 612 and clock circuit 614 may be used for a plurality of receivers 601, such as M receivers 601, operating in parallel. During each code sequence period, each of the M receivers 601 attempts to decode to received signal 657. Generally, the receiver 601 with the highest correlation signal 608 will be selected, and the received data recovered by translating the code sequence into data bits, in accordance with the M-ary techniques described elsewhere herein.

Figure 6:
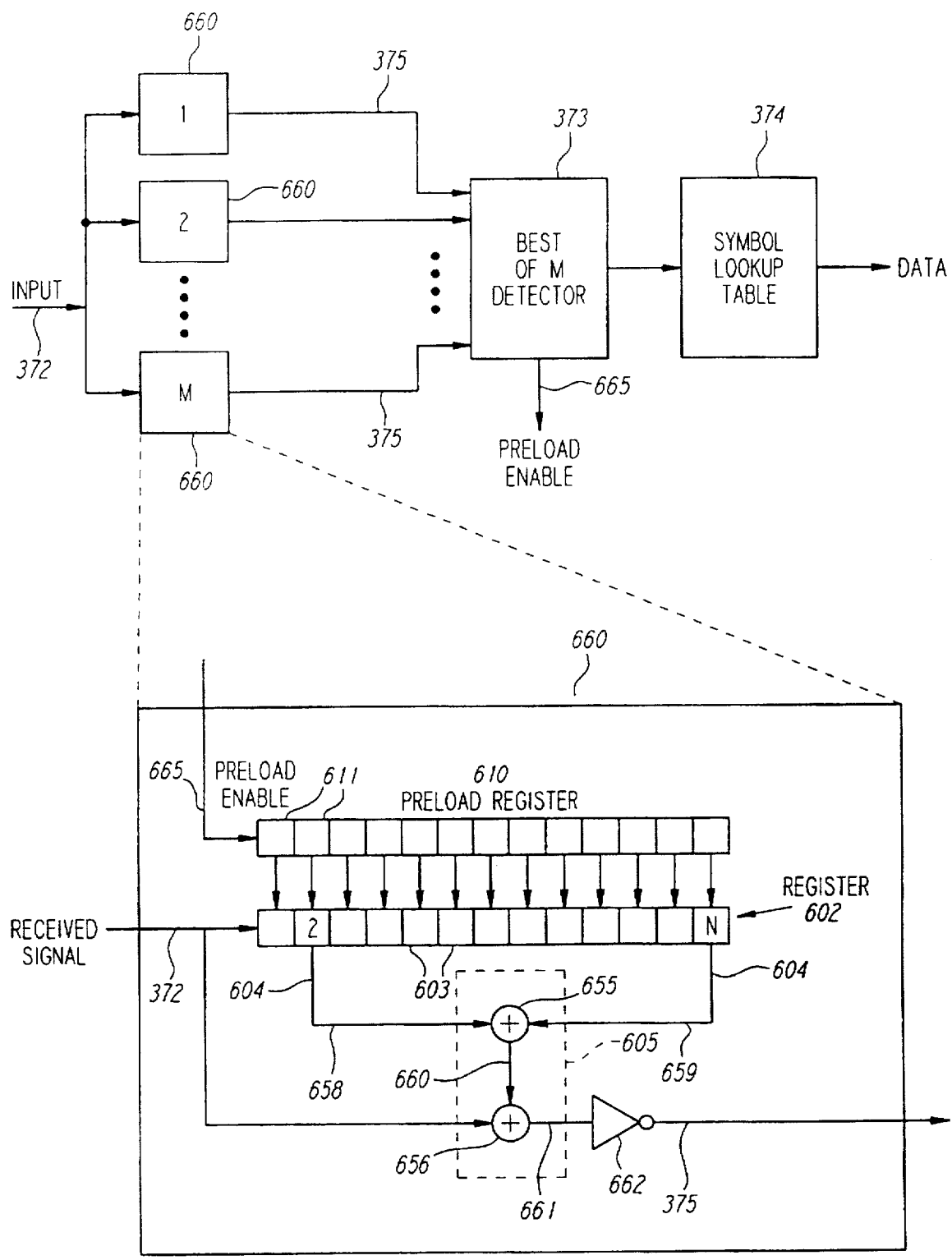
FIG. 6 is a block diagram of an alternative embodiment of a spread spectrum receiving system having a preloading capability for a plurality of parallel correlators, without the use of a preamble detector.

In an alternate embodiment, shown in FIG. 6, no preamble detector is used. One or more receivers 660 operate in parallel to receive an incoming signal. The receivers 660 each provide a correlation signal 375 to a best-of-M detector 373 such as shown in and described with respect to FIG. 14A. When a symbol is recognized, a preload enable signal 665 is sent to the preload register 610 of each receiver 660. The receivers 660 are thereby preloaded in parallel to detect incoming spread spectrum code sequences.

In one embodiment, the preload sequence comprises a trailing portion of the code sequence to be recognized. For example, the preload sequence may comprise the last chips in the code sequence, corresponding to chip positions from L–(N–1) to L, where L is the length of the code sequence to be recognized (i.e., position L is the last position in the code), and N is the length of the receiving shift register. In other words, the length of the preloading sequence is sufficient to fill the receiving shift register.

Figure 7A:
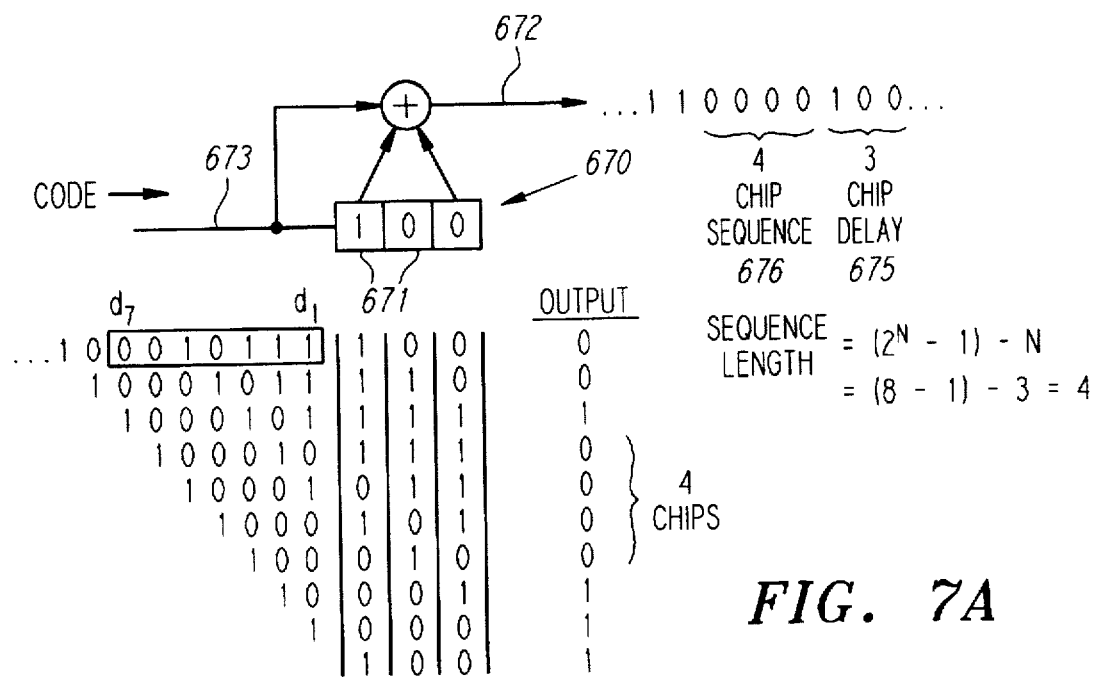
FIGS. 7A and 7B are diagrams showing code reception at a receiving shift register, and comparing results without use of preloading and with the use of a preloading technique, respectively.
Figure 7B:
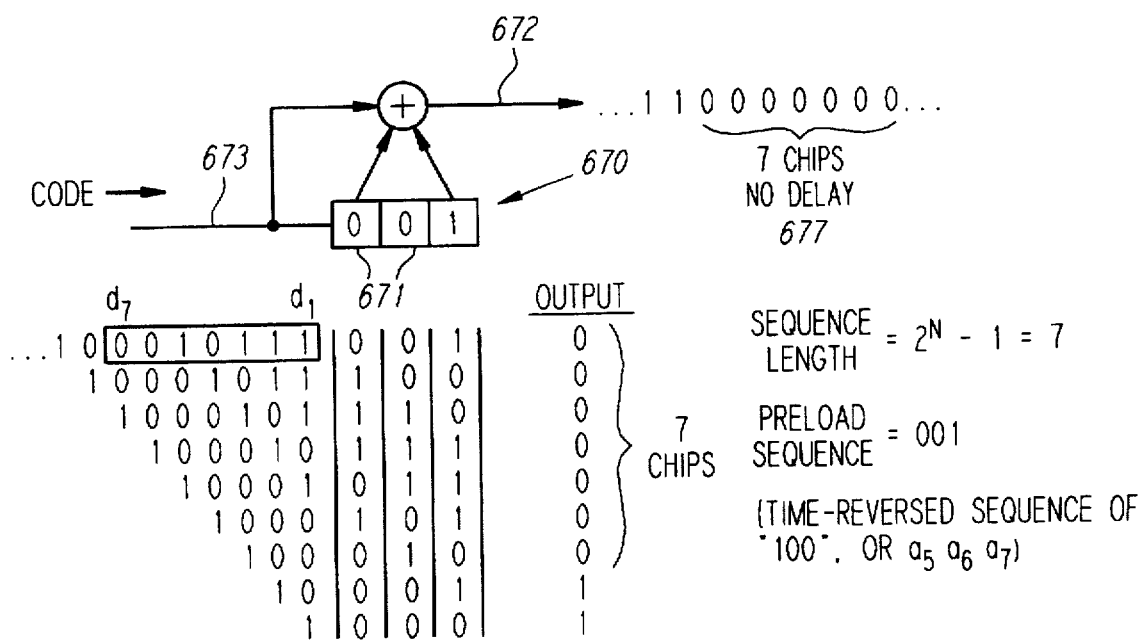

An example illustrating the effect preloading appears in FIGS. 7A and 7B. FIG. 7A shows receipt of an encoded signal without the use of preloading. A receiving shift register 670 of three stages 671 is assumed to have a random pattern of received chips, such as "100" (a time-reversed pattern of received chips "001"), when decoding of the incoming signal. The shift register 670 is configured to receive a code "1110100", which is a maximal linear code of length L=7 that may be generated in a transmitter shift register having three stages and two taps. The code is shown in FIG. 7A as being received with the first chip (a "1") to the farthest right, proceeding to the left sequentially as each chip in series is received. An output signal 672 is generated by combining the input signal 673 with the tapped locations from the shift register 670.

In FIG. 7A, the output signal 672 starts out with an essentially random 3-chip pattern 675 (e.g., "001") while the three stages 671 of the shift register 670 fill with the chips of the incoming signal 673. Starting with the 4th chip, a sequence 676 of "0"s begins, indicating recognition of the received sequence. The recognition sequence 676 is a length of $(2^N-1)$–N chips (or, more generally, L–N chips for a maximal or non-maximal code), where N is the number of stages in the receiving register 670. Thus, for a three-stage register 670, the recognition sequence 676 is 4 chips long.

FIG. 7B shows receipt of the same chip sequence where preloading occurs. The preload sequence selected comprises the last N chips of the code to be recognized, in this example "100" (loaded into the register as "001", which is the time-reversed version of the same sequence, due to the fact that the incoming signal 673 propagates from right to left as shown). As can be seen in FIG. 7B, the preload sequence causes the receiver to behave as though the code sequence to be recognized had already been received. Thus, the receiver outputs a sequence 677 of "0"s starting from receipt of the first chip in the code sequence to be recognized. The length of the elongated recognition sequence 677 is $2^N-1$ chips in length (i.e., the code length), where N is the number of stages 671 in the receiving register 670. Preloading therefore results in a longer recognition sequence 677, and can lead to a better error margin, more advanced error correction techniques than would otherwise be possible, and earlier recognition of received code sequences.

Figure 8:
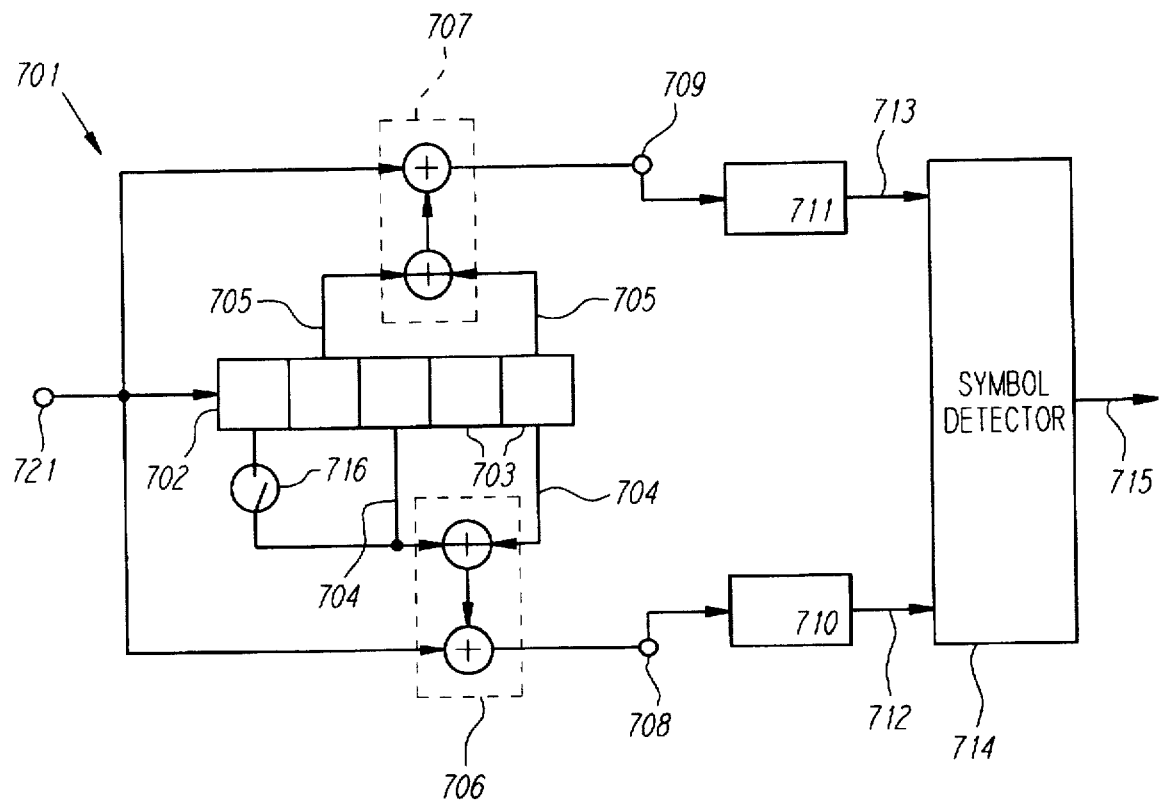
FIG. 8 is a block diagram of an embodiment of a spread spectrum receiver for receiving and identifying a plurality of spreading codes.

FIG. 8 is a block diagram of a spread spectrum receiver 701 for despreading for a plurality of spreading codes simultaneously. A received spread spectrum signal 721 is coupled to a shift register 702. The shift register 702 receives and stores a plurality of chips from the received signal 721 in delay stages 703 of the shift register 702.

A set of taps 704 is connected to a set of selected stages 703 of the shift register 702. The set of taps 704 corresponds to a first designated spreading code to be recognized by the receiver 701. Another set of taps 705, different from the first set of taps 704, is connected to a set of selected stages 703 of the shift register 702. The second set of taps 705 corresponds to a second designated spreading code to be recognized by the receiver 701. Similarly, a third and fourth set, and in general, any number of sets, of taps may be coupled to the shift register 702 for identifying any number of spreading codes to be recognized by the receiver 701.

Each set of taps 704, 705 (or others, if desired), and the received signal 721, is coupled to a separate modulo-2 adder 706, 707 respectively, each of which combines its inputs and produces a separate match signal 708, 709 respectively.

In a preferred embodiment, each detector 710, 711 comprises a counter that counts the number of logic "1"s, and outputs the total it finds. Each detector 710, 711 is reset at the beginning of each symbol time (e.g., every 32 chips) so that the count is restarted at zero for each symbol. The detectors 710, 711 may be initially synchronized using a preamble detector, similar to preamble detector 612 shown in FIG. 5 and described herein, or may be synchronized upon recognition of a symbol by the best-of-M detector 714 as explained with respect to FIG. 6.

The correlation signals 712, 713 are coupled to a symbol detector 714, which determines which of M designated spreading codes has been identified, and produces an output symbol 715 having $\log_2(M)$ data bits. In a preferred embodiment, the symbol detector 714 examines the correlation signals 712, 713 and determines which symbol has the maximum likelihood of having been transmitted (in response to which symbol has the maximum correlation on receipt). The symbol detector 714 may also decode the received symbol as a predetermined sequence of unique data bits corresponding to that symbol.

A preferred embodiment of the invention operates in a cellular environment for spread spectrum communication like that shown, for example, in U.S. Pat. No. 5,402,413 entitled "Three Cell Wireless Communication System," or U.S. patent application Ser. No. 08/293,671 entitled "PCS Pocket Phone/Microcell Communication Over-Air Protocol," both of which have been cited previously herein.

Figure 9:
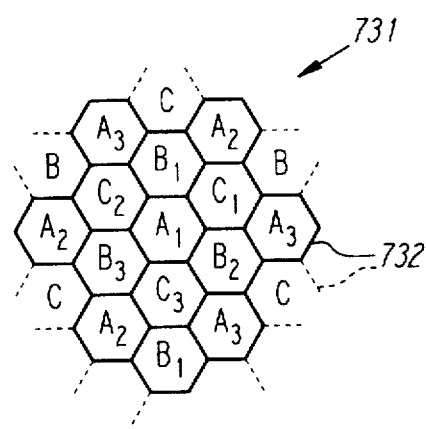
FIG. 9 is a diagram of an exemplary cellular environment in which various embodiments of the invention may be utilized.

FIG. 9 is a diagram of an illustrative cellular environment. In a preferred cellular environment for spread spectrum communication, a region 731 for communication may be divided into a set of cells 732 wherein a code and/or frequency reuse pattern may be deployed. For example, a 6-frequency, 3-code reuse pattern may be used. The cells 732 may therefore be divided into a set of cell types A1, A2, A3, B1, B2, B3, C1, C2, or C3, each of which may be assigned one of a plurality of frequencies f1, f2, f3, f4, f5 or f6, and one set of a plurality of sets c1, c2 or c3 of spread spectrum codes for communication at a given time. In a preferred embodiment, the cell types A1–A3, B1–B3 and C1–C3 may be disposed to promote communication within a cell 732 without interference from communication in a nearby cell 732. Thus, no cell type is adjacent to the same cell type. An example assignment of frequencies and spread spectrum codes is shown in Table 9-1.

TABLE 9-1

| Cell Type | Frequency/Code Combination |
|---|---|
| A1 | f1 c1 or f4 c1 |
| B1 | f2 c1 or f5 c1 |
| C1 | f3 c1 or f6 c1 |
| A2 | f1 c2 or f4 c2 |
| B2 | f2 c2 or f5 c2 |
| C2 | f3 c2 or f6 c2 |
| A3 | f1 c3 or f4 c3 |

TABLE 9-1-continued

| Cell Type | Frequency/Code Combination |
|---|---|
| B3 | f2 c3 or f5 c3 |
| C3 | f3 c3 or f6 c3 |

In a preferred embodiment, each of code sets c1, c2 and c3 comprises 32 spread spectrum codes for use as symbol codes (i.e., for M-ary communication), plus one or more additional spread spectrum codes for other purposes, such as to serve as a preamble. In an alternative preferred embodiment, there may be seven sets of 32 spread spectrum codes for symbols, plus one or more additional spread spectrum codes for other purposes.

The receiver of FIG. 8 may operate using different sets of spreading codes at different times. Thus, a preferred embodiment of the FIG. 8 receiver comprises switches 716 for each set of taps 704, 705, instead of a predetermined tap structure fixed in hardware. An example switch 716 is shown decoupling one tap 704. Using switches on a set of taps, the connections of taps 704, 705 to the shift register 702 may be controlled by a processor operating under software control, which may select a set of spreading codes to be recognized for a set of symbols, and may set the switches 716 to indicate that selected taps 704, 705, are coupled to or decoupled from selected stages 703 in the shift register 702.

In a preferred embodiment, the shift register 702, the taps 704, 705, and the switches 716 are implemented using an ASIC or FPGA such as those available from Xilinx Corporation.

Figure 10:
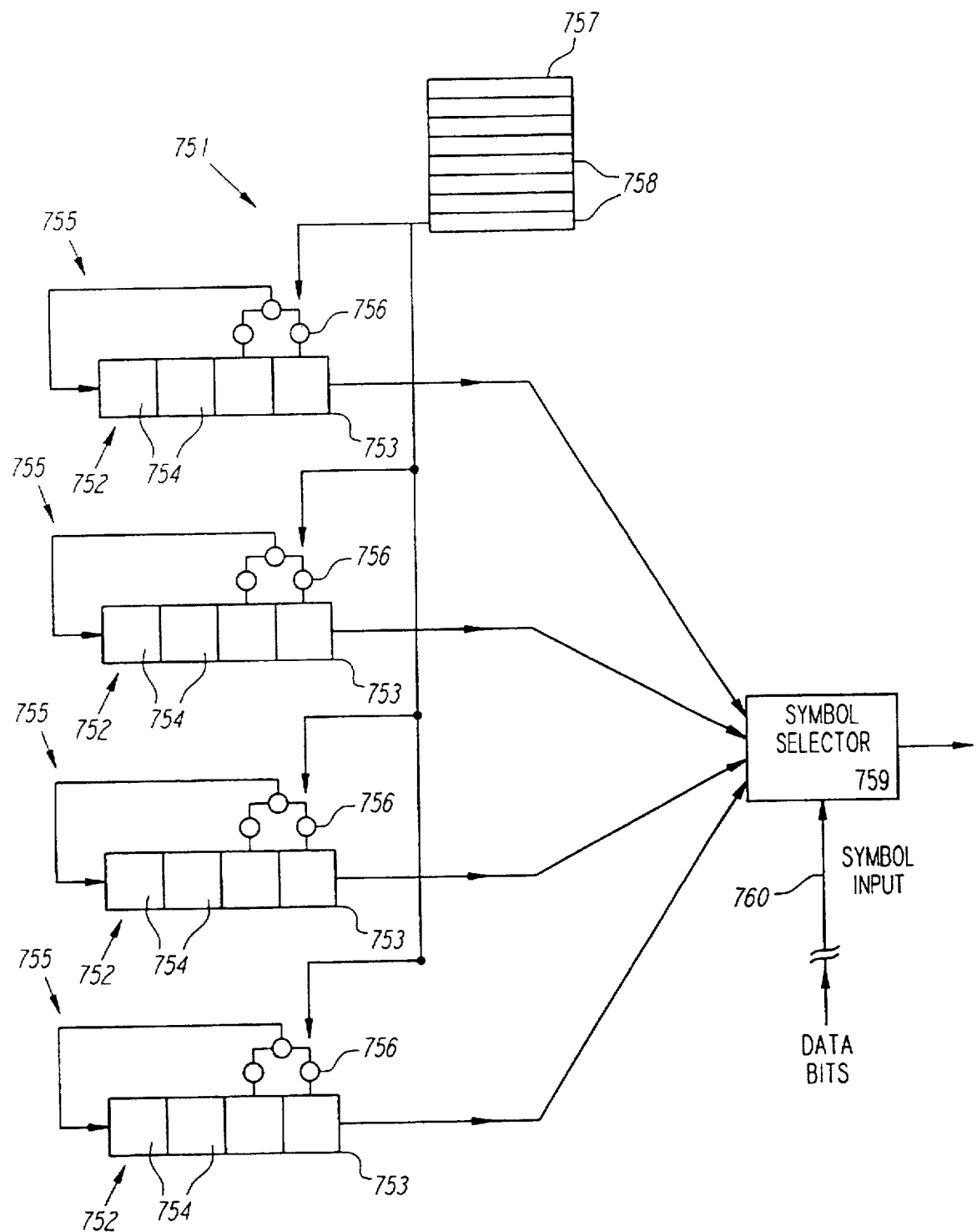
FIG. 10 is a block diagram of a preferred multi-symbol transmitter.

FIG. 10 is a block diagram of a preferred multi-symbol transmitter.

In the FIG. 10 embodiment, a transmitter 751 comprises a plurality of encoding linear feedback shift register generators 752, each of which is configured to produce a code sequence associated with a single symbol from a selected set of symbols. A symbol in this context may be a predefined series of data bits, such as a specific five-bit sequence. Each five-bit sequence is associated with a corresponding symbol code using an M-ary (i.e., 32-ary) spread spectrum encoding technique. Each encoding shift register 752 comprises a shift register 753 comprising a set of stages 754, configured using a single set of taps 755.

The set of taps 755 may be controlled by a set of switches 756 similar to the switches used with the tapped shift register 602 of FIG. 6 and taps 704, 705, at the receiver. The switches 756 may be "loaded" from a table 757 of symbol codes 758 by a processor operating under software control; that is, the switch positions may be set according to the particular the symbol codes 758 to be transmitted.

In the FIG. 10 multi-symbol transmitter, each encoding shift register 752 operates independently to generate a code sequence, and has an output coupled to a symbol selector 759. The symbol selector 759 is coupled to a symbol input 760, and selects a symbol code for transmission in response to the symbol input 760. The symbol input 760 may be a data signal comprising a sequence of data bits (i.e., a data symbol) corresponding to the symbol code to be transmitted. A preferred set of symbol codes is shown in hexadecimal notation in Table 10-1.

TABLE 10-1

| | 32-BIT CHIPPING AND TAP SEQUENCES BY SYMBOL | | | | |
|---|---|---|---|---|---|
| SYMBOL | CHIP SEQUENCE | TAP CONFIGURATION | | | |
| 1 | 00000000000111000111000101101111 | 13 | 4 | 3 | 1 |
| 2 | 11101101000111000111000000000000 | 13 | 12 | 10 | 9 |
| 3 | 00001101111001000110011011000111 | 13 | 5 | 2 | 1 |
| 4 | 11100011011001100010011110110000 | 13 | 12 | 11 | 8 |
| 5 | 01110110110111110110001100010111 | 13 | 5 | 4 | 2 |
| 6 | 11101000110001101111101101101110 | 13 | 11 | 9 | 8 |
| 7 | 01000100001000001100101100010010 | 13 | 6 | 4 | 1 |
| 8 | 01001000110100110000100000100010 | 13 | 12 | 9 | 7 |
| 9 | 01000000111100000101101010011011 | 13 | 6 | 5 | 2 |
| 10 | 10110010101101000001111100000010 | 13 | 11 | 8 | 7 |
| 11 | 00000111010001000010010010010100 | 13 | 7 | 3 | 1 |
| 12 | 00101010010010000100101111000000 | 13 | 12 | 10 | 6 |
| 13 | 00000111001101011101111100100100 | 13 | 7 | 3 | 2 |
| 14 | 00100100111011101011001111100000 | 13 | 11 | 10 | 6 |
| 15 | 01000011110111000010100001111010 | 13 | 7 | 5 | 2 |
| 16 | 01011110000101000111011111000010 | 13 | 11 | 8 | 5 |
| 17 | 11111111111000111000111101001000 | (CODES 17–32 | | | |
| 18 | 00010010111000111000111111111111 | SAME AS 1–16 | | | |
| 19 | 11110010000110111001100100111000 | BUT WITH INVERTED | | | |
| 20 | 00011100100110011101100001001111 | CORRELATORS) | | | |
| 21 | 10001001001000001001110011101000 | | | | |
| 22 | 00010111001110010000010010010001 | | | | |
| 23 | 10111011110111110011010011101101 | | | | |
| 24 | 10110111001011001111101111011101 | | | | |
| 25 | 10111111000001111101001010110010 | | | | |
| 26 | 01001101010010111110000011111101 | | | | |
| 27 | 11111100010111011110110110101011 | | | | |
| 28 | 11010101101101111011101000111111 | | | | |
| 29 | 11111000011001010001000011011011 | | | | |
| 30 | 11011011000010001010011000011111 | | | | |
| 31 | 10111100001000111010111100000101 | | | | |
| 32 | 10100000111101011100010000111101 | | | | |

Figure 11:
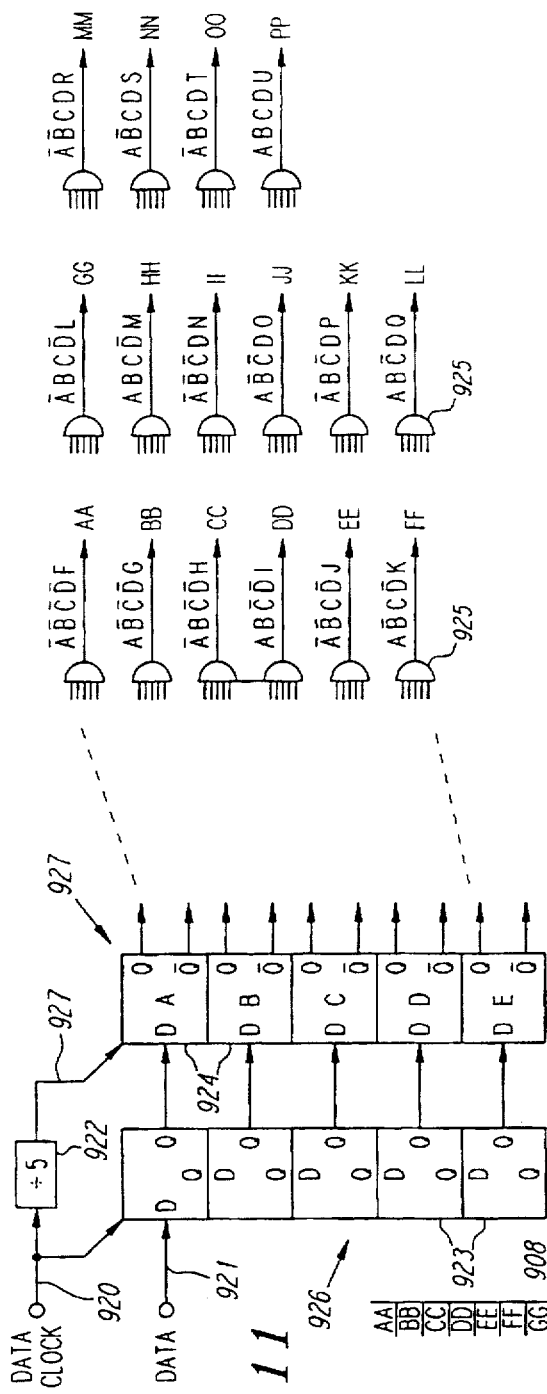
FIGS. 11 and 12 are detailed block diagrams of an embodiment of a preferred multi-symbol transmitter showing specific feedback tap locations.
Figure 11:
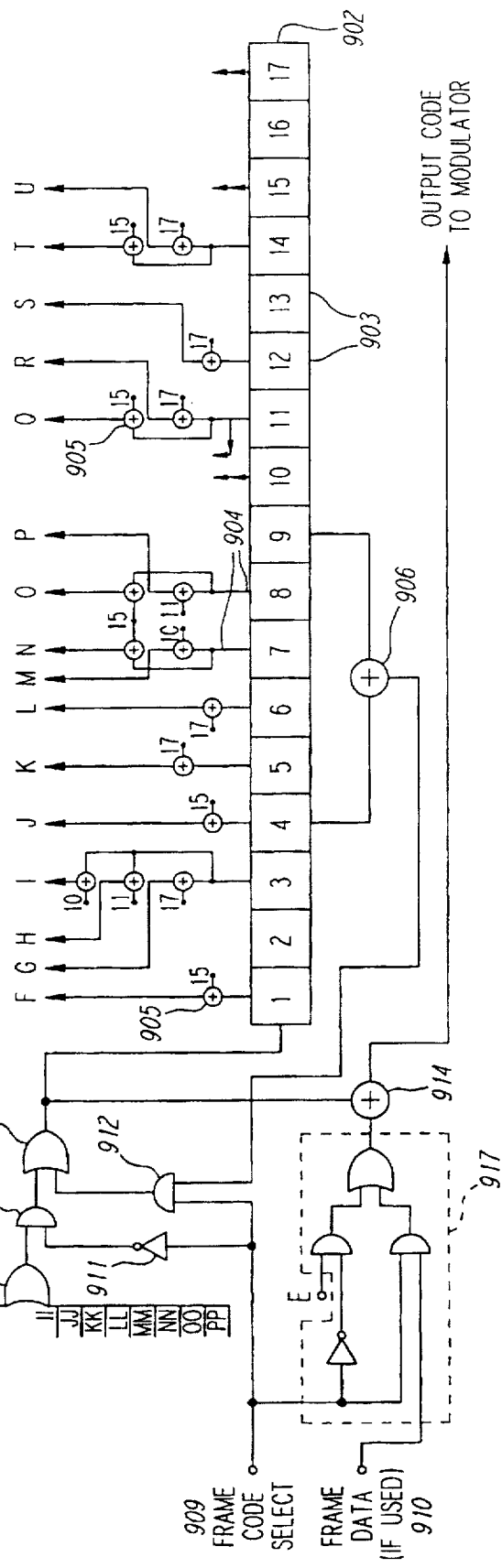
Figure 12:
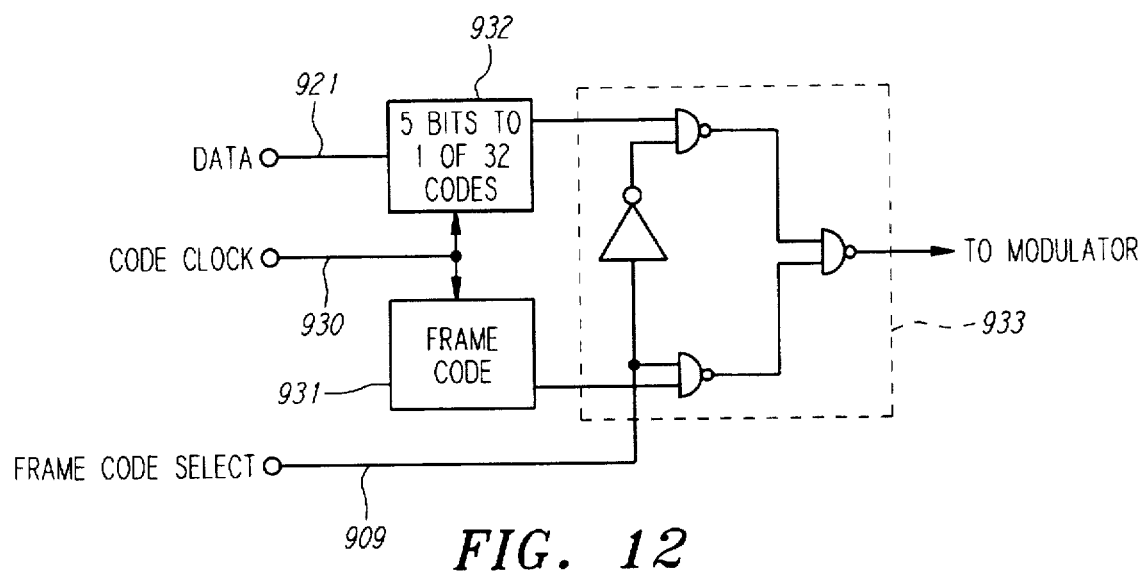

Another embodiment of a preferred multi-symbol transmitter is shown in FIGS. 11 and 12, using a single feedback shift register to generate a plurality of symbol codes.

In FIG. 11, a single tapped shift register 902 has a plurality of delay stages 903. Although the tapped shift register 902 is shown having 17 delay stages 903, the tapped shift register 902 can be of any size suitable for an intended application, depending on, for example, the number of different spreading codes required. Table 11-1 lists the connection polynomials for the FIG. 11 tapped shift register 902 whereby 32 different codes (16 codes and their complements, represented as barred connection polynomials) may be generated. Preferred connection polynomials for two frame codes (i.e., a single code and its complement) are $$\frac{1+x^4+x^9}{1+x^4+x^9}.$$

These codes may be used as a 32-ary code set for M-ary transmission of five-bit data sequences.

TABLE 11-1

| 32-ary code set | (16 codes and inverses) |
|---|---|
| $1+x^3+x^{10}$ | $1+x^{14}+x^{15}$ |
| $\overline{1+x^3+x^{10}}$ | $\overline{1+x^{14}+x^{15}}$ |
| $1+x^7+x^{10}$ | $1+x^{14}+x^{17}$ |
| $\overline{1+x^7+x^{10}}$ | $\overline{1+x^{14}+x^{17}}$ |
| $1+x^3+x^{11}$ | $1+x^3+x^{17}$ |
| $\overline{1+x^3+x^{11}}$ | $\overline{1+x^3+x^{17}}$ |
| $1+x^8+x^{11}$ | $1+x^{11}+x^{17}$ |
| $\overline{1+x^8+x^{11}}$ | $\overline{1+x^{11}+x^{17}}$ |
| $1+x^7+x^{15}$ | $1+x^6+x^{17}$ |
| $\overline{1+x^7+x^{15}}$ | $\overline{1+x^6+x^{17}}$ |
| $1+x^8+x^{15}$ | $1+x^{12}+x^{17}$ |
| $\overline{1+x^8+x^{15}}$ | $\overline{1+x^{12}+x^{17}}$ |
| $1+x^4+x^{15}$ | $1+x^5+x^{17}$ |
| $\overline{1+x^4+x^{15}}$ | $\overline{1+x^5+x^{17}}$ |
| $1+x^{11}+x^{15}$ | |
| $\overline{1+x^{11}+x^{15}}$ | |
| $1+x+x^{15}$ | |
| $\overline{1+x+x^{15}}$ | |

Each of the codes listed in Table 11-1 may be generated by and recognized with a shift register having only two taps. Non-linear multiply operations in the receiver are thereby minimized. The two taps in the transmitter need not be configured so as to generate a maximal linear code sequence, provided the code has an acceptable cross-correlation with other codes. Each of the particular codes of Table 11-1, however, happens to be a maximal linear code sequence.

In the FIG. 11 device, a plurality of taps 904 are connected to selected delay stages 903 of the shift register 902. The taps 904 are connected to a plurality of exclusive-OR gates 905 and combined so as to generate a plurality of feedback outputs, designated as outputs F through U in FIG. 11. The feedback outputs F through U are connected to a plurality of AND gates 925 in the manner shown in FIG. 11.

A data signal 921 is provided to a 5-bit serial buffer register 926 comprising a plurality of D flip-flops 923. Data bits from the data signal 921 are clocked into the serial buffer register 926 by a data clock signal 920. The data clock signal 920 is divided down by divider 922, to provide a data symbol clock signal 927. The data symbol clock signal 927 clocks the data bits from the serial buffer register 926 every five clock cycles of the data clock signal 920 into a data symbol register 927, which comprises a plurality of D flip-flops 924 designated A through E in FIG. 11.

For every five data bits of data signal 921, a new five-bit data symbol is thereby input into the data symbol register 927. The transmitter transmits a code sequence corresponding to the data symbol stored in the data symbol register 927. The shift register 902 may first be preloaded with an initial transmission sequence when a new data symbol is loaded into the data symbol register 927. The initial sequence locates the code generator at a predetermined region of the code sequence corresponding to the selected tap locations. Operation of the shift register 902 will result in generation of a code portion (e.g., 32 chips) which may be recognized by a receiver. At the other end of a communication channel, the receiver may (but need not) preload the receiving shift register so as to start recognition of the transmitted code portion from receipt of the first chip therein.

If preloading is not used, then the initial state of the shift register 902 is not important, and the receiving shift register will automatically correlate after receiving N (i.e., 17) chips. If, however, codes other than maximal linear codes are used, then the shift register 902 would need to be loaded with an initial state. Also, if preloading is used in the receiver so as to allow early recognition of the chip sequence, then loading of an initial state into shift register 902 would also be necessary so that the proper code segment will be sent.

Figure 13:
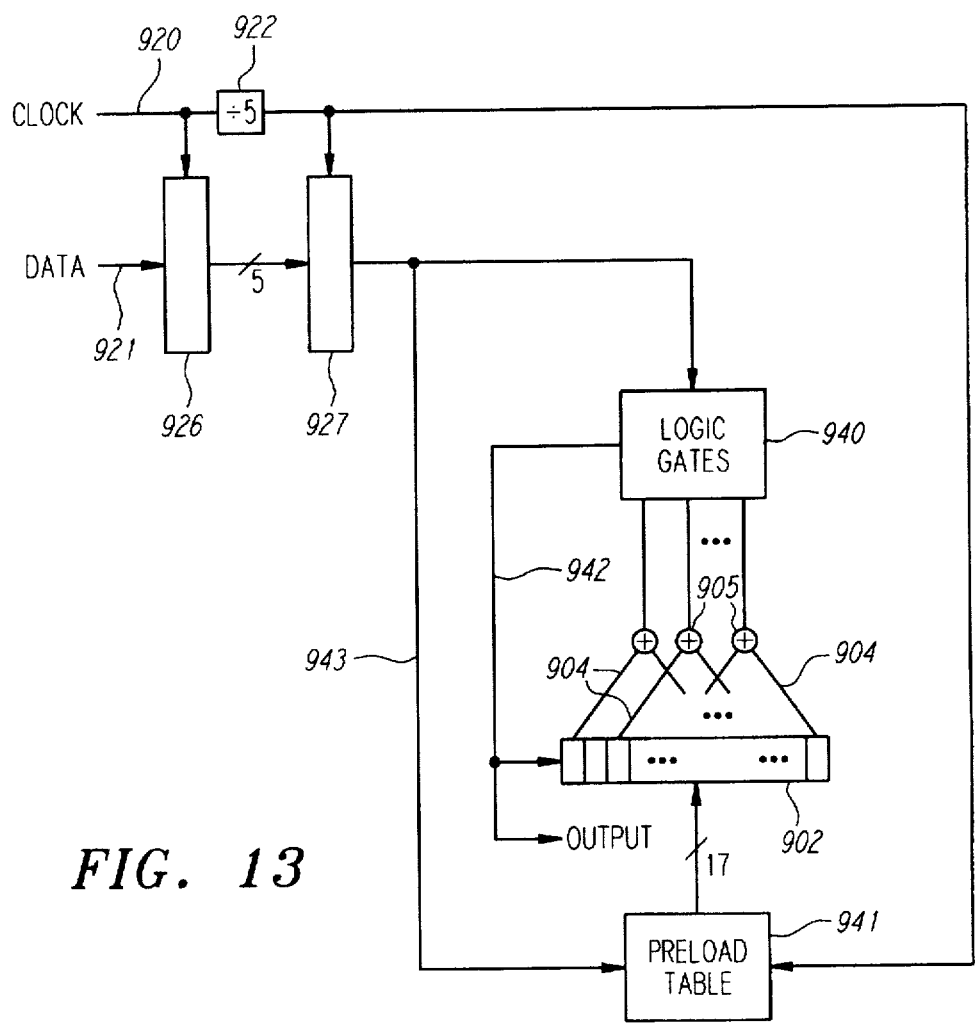
FIG. 13 is an alternative embodiment of the transmitter of FIGS. 11 and 12 showing a preload table for setting initial code conditions in the transmitter feedback shift register.

If non-maximal codes are used, then the initial state code sequence for each of M codes may be stored in a table, and loaded in a parallel manner into shift register 902 when a new data symbol is loaded into the data symbol register 927. FIG. 13 is a generalized block diagram of the transmitter of FIGS. 11 and 12 showing an initial sequence table 941 for setting initial code conditions in the transmitter feedback shift register 902. In the FIG. 13 embodiment, when a new data symbol is clocked into data symbol register 927, the new data symbol on address lines 943 is used as the address of the table 941. The table 941 stores a plurality of initial sequences, one for each data symbol. Each of the initial sequences is generally N chips in length, where N is the number of stages 903 in the shift register 902, and is loaded in parallel into shift register 902 after the new data symbol is latched into data symbol register 927. Generation of the spreading code will commence starting from a known initial point. The initial point may be adjusted, dynamically if desired, by changing the contents of the initial sequence table 941. The symbol code generated may be longer than the size of the shift register 902.

The outputs of flip-flops 924 designated A through D are provided to AND gates 925 in the manner shown. The AND gates 925 comprise in one aspect a table, whereby one of feedback outputs F through U is selected based on the values in locations A through D of register 926. The AND gates 925 each combine their inputs and generate outputs designated AA through PP in FIG. 11. The outputs AA through PP are connected to the input of an OR gate 908. So long as frame code select signal 909 remains low (i.e., a logical 0), the output of the OR gate 908 is fed back through OR gate 907 into shift register 902 to generate the appropriate code sequences.

While 16 code sequences can be selected based on the contents of flip-flops 924 designated A through D, the value stored in the flip-flop 924 designated E (i.e., the last bit of the data symbol stored in register 927) determines whether or not to select the complement of the code. Thus, the output of OR gate 907 is combined by exclusive OR gate 914 with the output of flip-flop E using connections shown in logic block 913. When the stored value in the E flip-flop is one binary value, a non-complemented version of the code sequence is selected, while if the stored value is another binary value, then a complemented version of the code sequence is selected. The output of exclusive OR gate 914 is connected to a modulator (not shown) for modulation on a carrier signal and subsequent transmission.

Alternatively, for generating the code complements shown in Table 11-1, the output of the shift register 902 may be selectively inverted, based on the contents of the flip-flop E, by use of an inverter rather than the logic connections shown in logic block 913.

When frame code select signal 909 is high (i.e., a logical 1), it is inverted by inverter 911 and then coupled to AND gate 915, which disables the feedback signal from OR gate 908. Through logic block 913, the frame code select signal 909 also disables the output of the flip-flop E from reaching the exclusive OR gate 914 when high. Frame code select signal 909 being high enables a feedback signal from exclusive OR gate 906, which is passed through AND gate 912 and OR gate 907 into the shift register 902. The exclusive OR gate 906 combines the chips from two selected delay stages 903 (in the present example, stages 4 and 9) and thereby produces a selected frame code sequence. The frame code sequence may serve, for example, as a preamble. The frame code sequence may be combined with a frame data signal 910, through the connections shown in logic block 913, by exclusive OR gate 914 prior to being modulated on a carrier signal and transmitted.

The FIG. 11 multi-symbol transmitter thus has a plurality of different tap settings (e.g., 16 tap settings), only one of which be gated as the output code at a given time. Each tap setting corresponds to a relatively long potential code sequence. However, only a relatively small, predetermined number of chips (e.g., 32 chips) are selected from the long code sequence to generate a particular symbol code. Thus, at a basic level, the FIG. 11 multi-symbol transmitter uses selected small portions of relatively long codes. A receiver may be configured to recognize the symbol codes generated by the FIG. 11 transmitter.

If initial conditions are selected for the shift register 902, then it will be known in advance which 32 chip code segment from the relatively long potential code sequence will be generated and transmitted. The receiver may be configured to take advantage of this pre-knowledge of the code segment, and to use preloading so as to recognize a symbol code starting from the first chip of a received code sequence. Thus, the receiver in such a case would preload a receiving shift register with N chips of the code sequence immediately preceding the 32 chip code segment.

FIG. 12 shows an overview at a conceptual level of the multi-symbol transmitter of FIG. 11. The data signal 921 is provided to a code generator 932, which reads each sequence of five data bits and outputs one of 32 code sequences in response thereto. A frame code generator 931 generates a frame code. Both the code generator 932 and the frame code generator 931 are responsive to a code clock 930. In a preferred embodiment, the code generator 932 and frame code generator 931 may use the same tapped shift register to generate the code sequences output therefrom.

The frame code select signal 909 selects either an output from the code generator 932 or the frame code generator 931, through the connections shown in logic block 933. The output from the logic block 933 is provided to a modulator for modulation onto a carrier signal, and the modulated signal thereafter is transmitted. Receipt of the frame code sequence (e.g., preamble) at the receiver may be interpreted by the receiver as an instruction to preload one or more receive registers in the expectation of receiving a series of code sequences.

A multi-symbol receiver may be configured so that the code sequence associated with each symbol is recognized from the first chip of that code sequence, rather than waiting for N chips (where N is the length of the tapped shift register in the receiver) to be received before the symbol is recognized.

A multi-symbol receiver may be constructed using the techniques of the receivers shown in FIGS. 5 and 8. A plurality of M receivers may be used in parallel, one for each symbol code to be recognized. Each shift register 602 of each receiver is preloaded with a segment of the code sequence to be recognized, and, if that particular code sequence is sent, behaves as if the previous N chips were correctly recognized already. Without preloading, the system would experience a delay of N chips during which time the tapped shift register in the receiver would be loaded with the received signal chips, prior to a stream of consecutive "0"s (or "1"s if inverted) being generated and the symbol code being recognized thereby.

Preloading may also provide improved accuracy as a result of the fact that a count of matched chips from the beginning to end of a code sequence would tend to be more accurate than a count of matched chips from N chips to the end of the code sequence (i.e., L chips, where L is the code sequence length). For example, where a 32-chip code sequence is sent to a receiver having a 13-stage tapped shift register, a count of matched chips from the beginning to end of the 32-chip code sequence (i.e., 32 possible matches) would normally lead to greater accuracy than a count of matched chips from after chip 13 to the end of the 32-chip code sequence (i.e., 19 possible matches).

Some applications may require more linear codes than it may be possible to generate with a given shift register length. For example, a 5-stage tapped shift register with two taps is capable of generating linear maximal sequences having a length of $2^5-1=31$ chips. However, there are only six linear maximal codes of length 31, which may not provide enough selection of linear maximal codes for all applications. Longer registers may be used to generate more linear code sequences, but use of longer registers increases the length of the tapped shift register at the receiver, which in turn increases the correlation interval and the length of time before a correlation decision is possible. Longer codes may also slow the data transmission rate.

To allow for more available spreading codes, one technique is to select a code of a desired length (e.g., 31 chips) from a register much longer than necessary to generate the code sequence. Thus, segments or subsequences of relatively long code sequences are selected as spreading codes, resulting in many more potentially useful code sequences being available. For example, there are more than one billion possible non-overlapping codes of length 31 available from a 31-stage shift register generator.

A determination of relatively short binary sequences satisfying the desired auto-synchronizing properties earlier described may, in general terms, be made from a relatively long shift register generator. One technique for determining such binary sequences, and the corresponding preloading sequences, is as follows. A selection is made of a maximum desired delay period or shift register size in the receiver (e.g., $N_R$ stages). The next step is to select a set of feedback taps corresponding to a connection polynomial of a degree matching the maximum desired delay period. For example, if two feedback taps are desired, the first tap is placed at location $N_R$ in the shift register, and the second tap is placed at another stage, for example the first stage, and can be moved sequentially to the following stages until an acceptable code is found. Thus, if $N_R=10$, then taps may first be selected so as to correspond to a connection polynomial of $1+x+x^{10}$. If the code generated thereby is unacceptable, taps may then be selected corresponding to a connection polynomial of $1+x^2+x^{10}$, and so on until an acceptable code is found.

Next, a code segment is selected from the code generated by the tapped shift register. For example, a code segment of 32 chips may be selected from the code generated by a feedback code generator configured in accordance with the connection polynomial chosen. If the tap positions in the receiver are configured to match the feedback tap positions in the transmitter, then the selected code segment will auto-synchronize when received at the receiver, after a delay of $N_R$ chips.

To begin auto-synchronizing immediately upon receipt of a code segment derived from the longer code sequence, the receiving shift register may be preloaded with an initial sequence. The initial sequence is typically the $N_R$ chips preceding the code segment in the code sequence from which the code segment was selected. In such a case, the receiver will behave as though the immediately preceding portion of the code sequence had already been received, and auto-synchronization will commence immediately upon receipt of the selected code segment.

Figure 14:
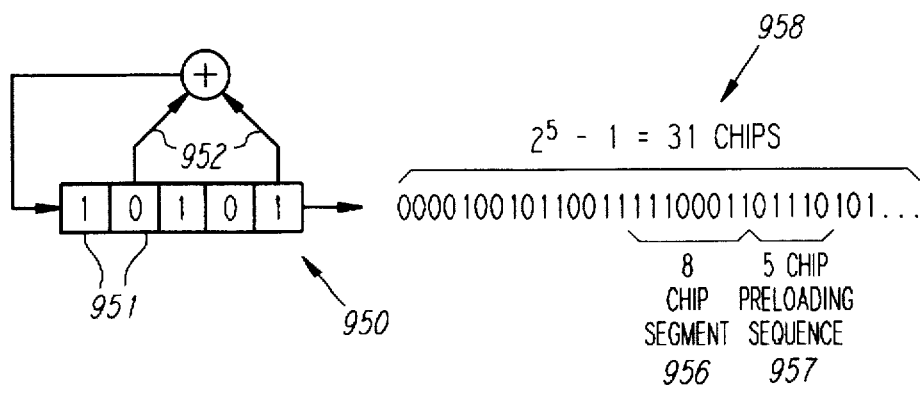
FIG. 14 is a diagram of a transmitter tapped shift register and a corresponding receiver tapped shift register, illustrating the selection of a chip segment from a longer chip code and a preloading sequence for early recognition of the selected chip segment.
Figure 14:
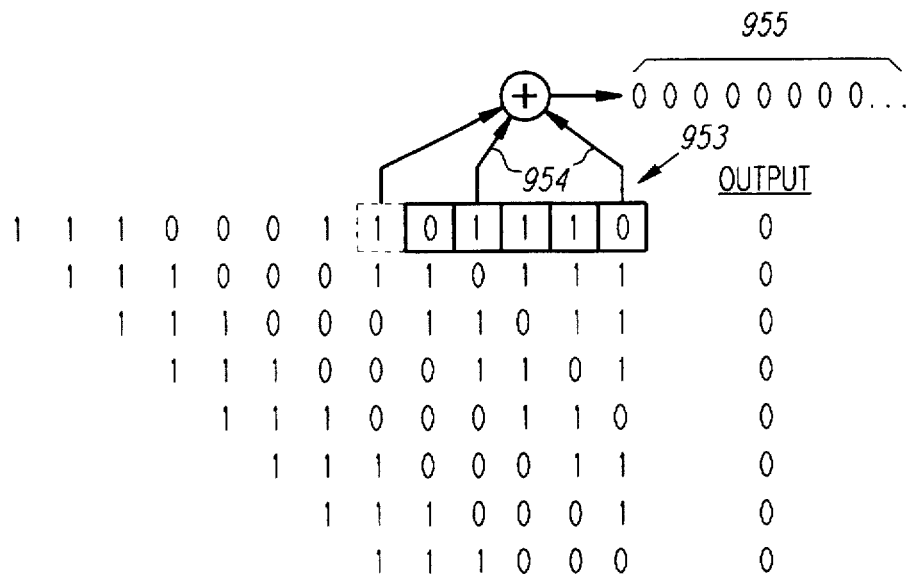

An example of code segment and initial preloading sequence selection is described with respect to FIG. 14. In FIG. 14, a feedback code generator 950 of five stages 951 is configured with two feedback taps 952. The feedback code generator 950 may produce a 31-chip sequence 958 as shown, with the output in time appearing from right to left. An 8-chip segment 956 of the 31-chip sequence 958 is selected for transmission. The 8-chip segment in the example of FIG. 14 is "11000111". When the 8-chip segment 956 is received and applied to a shift register 953 configured with two taps 954 in the same manner as the feedback code generator 950, the receiver will output a sequence 955 of consecutive "0"s after a delay of 5 chips.

If preloading is used for early recognition of the selected code segment, a preloading sequence 957 is selected comprising the chips immediately preceding the selected segment 956. The preloading sequence 957 in the example of FIG. 14 is "01110". When the preloading sequence 957 is loaded in the receiving shift register 953, the receiver will act as though it has already been receiving the longer code 958 from which the 8-chip segment 956 was selected. Thus, the receiver will output a sequence 955 of all "0"s starting from receipt of the first chip of the 8-chip segment 956.

Accordingly, in a particular embodiment, a tapped shift register having N stages is used to generate a code sequence for transmission, where N is more than the number of stages needed for generating the transmitted code sequence. Only a segment of an entire code that could be generated with the N-stage register is selected for transmission, where the segment corresponds to a particular longer code sequence (such as a 31-chip code sequence). The code from which the segment is selected need not be a maximal code. A set of taps 704 used at the receiver are selected so as to match the selected code and allow recognition of the transmitted code sequence.

In one embodiment, the same preloading sequence is used for all the symbol codes. However, in such an embodiment, each symbol code starts with the same initial code sequence, and may therefore lead to less favorable cross-correlation characteristics.

Figure 15:
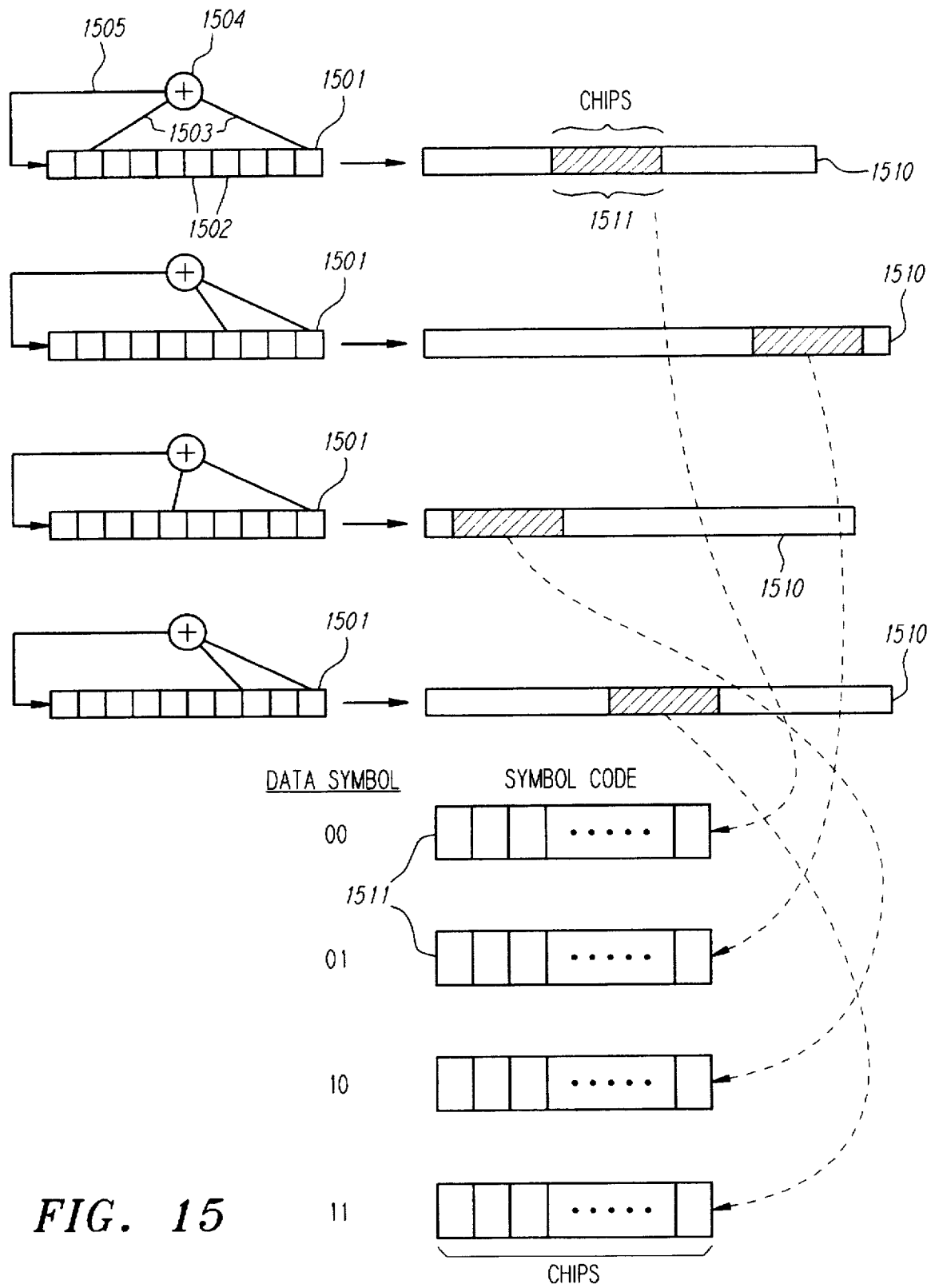
FIG. 15 is a diagram illustrating selection of code portions from longer spread spectrum codes generated from shift registers having different feedback tap configurations.

FIG. 15 is a diagram illustrating selection of code portions from longer spread spectrum codes generated from shift registers having different feedback tap configurations. A plurality of feedback shift registers 1501 (or, alternatively, a single feedback shift register with multiple tap sets) are configured with taps 1503 each defining a different spread spectrum code. Outputs from the taps 1503 are combined by an exclusive-OR gate 1504 to produce a code output 1505 which is generally fed back into the shift register 1501 as described elsewhere herein. Each feedback shift register 1501 generates a different spread spectrum code 1510. The taps 1503 may be configured to generate either a linear maximal or a non-maximal code, and hence the spread spectrum codes 1510 may be of differing lengths, even if the shift registers 1501 are of the same size.

A code length L is selected. The code length L may be based on the requirements of the system application and may be, for example, 32 chips long. From each spread spectrum code 1510, a code portion 1511 of L chips is selected. The number of code portions 1511 and, hence, the number of spread spectrum codes 1510 may be equal to the number of symbol codes needed for transmitting M data symbols using an M-ary technique. Thus, for a 4-ary system (as shown in the example of FIG. 15), four code portions 1511 would be selected from four spread spectrum codes 1510. More than one code portion can be selected from the same spread spectrum code 1510, but may lead to less desirable cross correlation properties. The code portions 1511 are tested for low cross correlation properties and favorable auto correlation properties. If the code portions 1511 are not satisfactory, other code portions 1511 may be selected from the same spread spectrum codes 1510, or tap locations 1503 may be altered on the shift registers 1501 and new spread spectrum codes 1510 generated, and/or the length of the shift registers 1501 may be adjusted (not all need be of the same length).

If a non-maximal code 1510 is generated by appropriate placement of the taps 1503, then the code sequence preceding the selected code portion 1511 may be saved for use in the initial sequence table 941 (as shown, e.g., in FIG. 13). The code sequence preceding any selected code portion 1511 (whether or not maximal) may be saved for use in the initial sequence table 941 and the preloading registers 610 (as shown, e.g., in FIG. 6) in the case where preloading is used.

Figure 16:
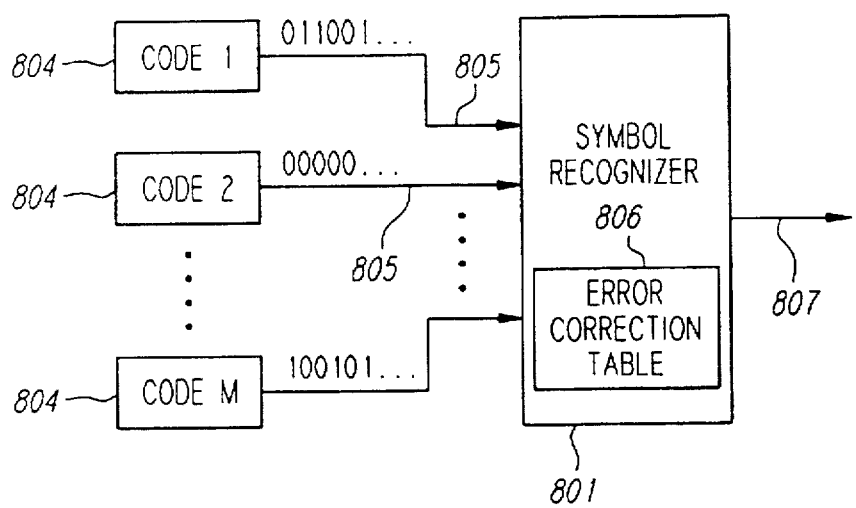
FIG. 16 is a block diagram of an embodiment of a symbol recognizor for a spread spectrum receiver whereby code sequence errors may be detected and corrected.

FIG. 16 is a block diagram of a symbol recognizor for a spread spectrum receiver in which code sequence errors may be detected and corrected.

In the FIG. 16 embodiment, a plurality of receivers 804 operate in parallel, each configured to recognize a particular code sequence. Each of the receivers 804 may comprise a receiver such as depicted, for example, in FIGS. 4, 5, 6, or 8. An output signal 805 from each of the receivers 804 is coupled to a symbol recognizor 801. The output signals 805 may each comprise an output from a sequence detector (e.g., sequence detector 607 from FIG. 5) located at the receiver 804, or may comprise a sequence of chips from each receiver 804. In the latter case, for each output signal 805, a counter or sequence detector may be provided in the symbol recognizor 801 so as to count predetermined sequences of chips (e.g., a sequence of "0"s or all "1"s of a predetermined length, or a predetermined number of "0"s or "1"s in the correlation signal for a set of chips of predetermined length).

Based on the output signals 805, the symbol recognizor 801 determines which symbol code of a plurality of symbol codes was most likely to have been received. When the correct sequence of chips appears in the received signal, assuming L is the chip length of a symbol code, only one of the output signals 805 generated by a receiver 804 will ordinarily comprise the expected recognition sequence of L logic "0"s (or "1"s if inverted), a correct match. However, if any chip is received in error, the output signal 805 for the correct symbol may not have such a characteristic.

Where no output signal 805 indicates a correct match or recognition sequence, the most likely received symbol may be determined in certain circumstances by looking at the derived correlation values and the relationship between certain symbol pairs.

Each pair of symbols codes in the set of designated symbols codes has a cross-correlation or a Hamming distance. Cross-correlation is defined as the difference between the number of agreements and the number of disagreements for chips in the code sequence, while Hamming distance H is defined as the number of disagreements. As described herein, the cross-correlation q and the Hamming distance H are related by the equation $H=(L-q)/2$, as shown for the example of L=32 in Table 16-1.

TABLE 16-1

| Cross-Correlation (g) | Hamming Distance (H) |
| --- | --- |
| 0 | 16 |
| 2 | 15 |
| 4 | 14 |
| 6 | 13 |
| 8 | 12 |
| 10 | 11 |

Based on the minimum Hamming distance H between pairs of symbols, the symbol recognizor 801 (of FIG. 16, e.g.) may, in a preferred embodiment, reliably detect errors of up to H/2 chips and may reliably correct a up to H/2 chip errors, rounded down to the nearest integer.

The symbol recognizor 801 receives the output signals 805, and generates a match count of the number of logic "0"s (or logic "1"s if inverted) in each output signal 805. Assuming preloading is used, a correct match will have the maximum value L for an L-chip code sequence. Thus, for a 32-chip code sequence, the maximum correlation value is 32. Where there is no correct match, the symbol recognizor 801 may select the symbol code with the highest match count, so long as the symbol code with the next-highest count is not too close.

In this context, "too close" is defined with reference to Hamming distance H. If the symbol code to be selected has a match count K, the number of chip errors is at least (L–K). Thus, if any other symbol code has a match count greater than or equal to (2K–L), the symbol code to be selected cannot be unambiguously recognized. However, where there are only two symbol codes that cannot be unambiguously distinguished, the receiver may choose one of those two symbol codes based on certain assumptions, with the knowledge that all other symbol codes have been ruled out.

In addition, the receiver may also tag the chosen symbol code with an indicator that there was an alternative symbol code, so that a higher level of error correction may correct the choice to the alternative symbol code, e.g., upon detection of a cyclical redundancy check (CRC) mismatch or a block parity error.

In a preferred version of this embodiment, a set of chip sequences with length L=32 and with zero cross-correlation q may be selected. The minimum Hamming distance H for any pair of symbol codes is therefore H=16, so up to (H–1)/2 (rounded down)=7 erroneous chips in each code sequence may be corrected.

Since cross-correlation is the number of agreements minus the number of disagreements (A–D), and Hamming distance H is the number of disagreements, the cross-correlation is also a measure of error correction capability. For cross-correlation equal to zero, the Hamming distance is 16 and the error correction capability is 7, i.e., up to 7 chip errors may occur on reception and the symbol can still be unambiguously recognized.

Table 16-2 shows a preferred code set, including preamble codes whose cross-correlation is less than or equal to six, and symbols codes whose cross-correlation is less than or equal to ten. Table 16-3 shows a second such preferred code set. Table 16-4 shows a third such preferred code set. These code sets have been found by the inventors to be the linear maximal codes simultaneously having maximum Hamming distance H and minimum number of taps 704, 705.

TABLE 16-2

| Code Set 1 | |
| --- | --- |
| Preambles Taps | $\ominus \leq 6$ Code (t →) |
| [32, 5, 3, 2, 1] | 10011110110000100111101100001001 |
| [8, 6, 3, 2, 1] | 10010101111110010000011111010010 |
| Data Codes Taps | $\ominus \leq 10$ Code (t →) |
| [7, 6, 3, 2, 1] | 10010111011110100110101011011001 |
| [11, 6, 3, 2, 1] | 10010100010011010110100100111100 |
| [12, 6, 3, 2, 1] | 10010100011001011100101011000001 |
| [13, 6, 3, 2, 1] | 10010100011100011001110110111000 |
| [8, 7, 3, 2, 1] | 10010000110010101011011010111010 |
| [9, 7, 3, 2, 1] | 10010001100011011101110001110100 |
| [22, 7, 3, 2, 1] | 10010001010011100110111001100111 |
| [9, 8, 3, 2, 1] | 10010011000011100101000110111101 |
| [11, 9, 3, 2, 1] | 10010010101110100101010000100100 |
| [12, 10, 3, 2, 1] | 10010010001100001110110011000111 |
| [19, 12, 3, 2, 1] | 10010010010100010111011100000110 |
| [32, 13, 3, 2, 1] | 10010010010001010001010011100101 |
| [27, 21, 3, 2, 1] | 10010010010010010010010010010011 |
| [6, 5, 4, 2, 1] | 10111011010100111100011001000000 |
| [7, 5, 4, 2, 1] | 10111110001111011011100100110101 |
| [12, 5, 4, 2, 1] | 10111101000100100010110010111010 |
| [13, 5, 4, 2, 1] | 10111101000011100101111100010101 |
| [23, 5, 4, 2, 1] | 10111101000010111101001110000011 |
| [16, 6, 4, 2, 1] | 10110110011111100001111111111111 |
| [18, 6, 4, 2, 1] | 10110111001111101111011000011100 |
| [11, 8, 4, 2, 1] | 10110000110011010101011101001000 |
| [18, 8, 4, 2, 1] | 10110000111111101111100110000011 |
| [12, 9, 4, 2, 1] | 10110001101101001011001011111001 |
| [14, 9, 4, 2, 1] | 10110001101010110010100011100010 |
| [21, 14, 4, 2, 1] | 10110001011001001011000101000110 |
| [16, 15, 4, 2, 1] | 10110001011000000110011110001011 |
| [25, 20, 4, 2, 1] | 10110001011000101101110010100101 |
| [13, 6, 5, 2, 1] | 10100000101011000110000000101101 |
| [10, 7, 5, 2, 1] | 10100101101111111100001000100110 |
| [13, 7, 5, 2, 1] | 10100101110101010011100101101011 |
| [19, 7, 5, 2, 1] | 10100101110110011100100111011100 |
| [21, 7, 5, 2, 1] | 10100101110110011111011000010011 |

TABLE 16-3

| Code Set 2 | |
| --- | --- |
| Preambles Taps | $\ominus \leq 6$ Code (t →) |
| [9, 6, 3, 2, 1] | 10010100101111000101101010011100 |
| [10, 6, 3, 2, 1] | 10010100000111000001101011101011 |
| Data Codes | $\ominus \leq 10$ |

TABLE 16-3-continued

Code Set 2

| Taps | Code (t → ) |
|---|---|
| [14, 10, 5, 2, 1] | 1010011010000001000100111 0000101 |
| [17, 10, 5, 2, 1] | 1010011010000111101111100 1111110 |
| [22, 11, 5, 2, 1] | 1010011011010010010011001 1100110 |
| [14, 13, 5, 2, 1] | 1010011011101011111011110 1001101 |
| [21, 15, 5, 2, 1] | 1010011011100010011100011 1111011 |
| [20, 8, 6, 2, 1] | 1010110101110100110011010 110000 |
| [13, 9, 6, 2, 1] | 1010110000101111011010111 101010 |
| [23, 9, 6, 2, 1] | 1010110000100011011110010 1010110 |
| [22, 20, 6, 2, 1] | 1010110011101111001101010 011111 |
| [9, 8, 7, 2, 1] | 1010100011000110110010101 1110011 |
| [18, 8, 7, 2, 1] | 1010100000001010111001101 1001001 |
| [24, 8, 7, 2, 1] | 1010100000010101000000100 110000 |
| [22, 11, 7, 2, 1] | 1010100110100010000100111 0101110 |
| [23, 14, 7, 2, 1] | 1010100110010111010010001 0000000 |
| [13, 9, 8, 2, 1] | 1010101111100011001110001 111101 |
| [25, 9, 8, 2, 1] | 1010101111111010101000011 000111 |
| [25, 15, 8, 2, 1] | 1010101100110010001001010 1100101 |
| [14, 11, 9, 2, 1] | 1010101001010011101100111 1010111 |
| [26, 15, 10, 2, 1] | 1010101011001111110111011 0101100 |
| [22, 17, 10, 2, 1] | 1010101011001100001001001 011011 |
| [21, 18, 15, 2, 1] | 1010101010101001111100110 0111010 |
| [20, 7, 4, 3, 1] | 1101001001100010100110100 0011110 |
| [18, 10, 4, 3, 1] | 1101000111011010100010010 0111111 |
| [24, 14, 4, 3, 1] | 1101000110100100110111110 1000011 |
| [29, 17, 4, 3, 1] | 1101000110100011011010110 000000 |
| [25, 19, 4, 3, 1] | 1101000110100011011110101 0111111 |
| [18, 8, 5, 3, 1] | 1100001011101111011011011 111001 |
| [10, 9, 5, 3, 1] | 1100001110000100110001000 0011110 |
| [14, 11, 5, 3, 1] | 1100001100110111101111111 0111001 |
| [28, 12, 5, 3, 1] | 1100001100010010001100100 0000000 |
| [18, 17, 5, 3, 1] | 1100001100001100101110001 1001010 |
| [9, 7, 6, 3, 1] | 1100100001000101111111010 1001111 |

TABLE 16-4

Code Set 3

| Preambles | Θ ≤ 6 |
|---|---|
| Taps | Code (t → ) |
| [10, 7, 3, 2, 1] | 1100100010111010111101010 1110011 |
| [7, 6, 5, 2, 1] | 1010001110011000100111110 0001100 |
| Data Codes | Θ ≤ 10 |
| Taps | Code (t → ) |
| [13, 7, 6, 3, 1] | 1100100010111010111101010 1110011 |
| [17, 12, 6, 3, 1] | 1100101101100100011000111 1110100 |
| [20, 12, 6, 3, 1] | 1100101101100100100011010 0100010 |
| [26, 10, 7, 3, 1] | 1100111101111011011100110 0100101 |
| [20, 16, 7, 3, 1] | 1100111100000010110000111 1101111 |
| [24, 16, 7, 3, 1] | 1100111100000010110111000 00010001 |
| [31, 10, 8, 3, 1] | 1100110101010110011000000 0001110 |
| [24, 18, 9, 3, 1] | 1100110000111100100001011 10011011 |
| [32, 20, 10, 3, 1] | 1100110010110100100110101 0000101 |
| [24, 13, 11, 3, 1] | 1100110011111111111001011 1010000 |
| [29, 15, 11, 3, 1] | 1100110011110011001111110 0111110 |
| [22, 18, 14, 3, 1] | 1100110011001011001101001 0000101 |
| [31, 20, 19, 3, 1] | 1100110011001100111011101 1011101100 |
| [24, 7, 5, 4, 1] | 1110111101011100110110111 0000110 |
| [26, 7, 6, 4, 1] | 1110011110101001001010001 1110001 |
| [13, 10, 6, 4, 1] | 1100100001001100101011011 1011101 |
| [20, 10, 6, 4, 1] | 1110010000010101100010101 0111100 |
| [32, 12, 6, 4, 1] | 1100100010010000010001010 1011000 |
| [21, 16, 6, 4, 1] | 1100100010110010000110110 0000000 |
| [28, 14, 7, 4, 1] | 1110000001110111110110000 0111011 |
| [24, 23, 8, 4, 1] | 1110010011101011010010101 0100010 |
| [19, 17, 12, 4, 1] | 1110001110010001011110011 0010110 |
| [27, 19, 15, 4, 1] | 1110001110001101111101111 1101111 |
| [28, 8, 6, 5, 1] | 1111011011001000101000011 0110101 |
| [25, 13, 9, 5, 1] | 1111000000000000111000011 11110 |
| [32, 30, 10, 5, 1] | 1111000010001110100110010 010111 |
| [30, 21, 16, 5, 1] | 1111000011110001000000010 0000100 |

TABLE 16-4-continued

Code Set 3

| [31, 28, 21, 5, 1] | 1111000011110000111111100 011101 |
|---|---|
| [15, 8, 7, 6, 1] | 1111101000110001001100001 101000 |
| [30, 18, 7, 6, 1] | 1111101111001110110011101 011001 |
| [24, 9, 8, 6, 1] | 1111100100111101010100110 1100010 |
| [23, 18, 8, 6, 1] | 1111100111000010000101000 1110011 |

For the purposes of Tables 16-2 through 16-4, the receiving shift register is assumed to have 13 stages. A set of taps is designated by chip location in the shift register; thus "[7, 6, 3, 2, 1]" indicates taps set at chips 7, 6, 3, 2, and 1. In Tables 16-2 through 16-4, a set of particular spreading codes generated from the tap connections is shown by the chip sequence that is to be sent for each data symbol. Initial preloading chip sequences allowing early recognition of the codes shown in Tables 16-2 through 16-4 may be derived by methods described previously herein.

In a preferred embodiment, a received code sequence is compared with a selected symbol code, e.g., by means of an XOR circuit, and those chips that differ form a set of error chips. If a single chip is received in error, then the error will be multiplied by the feedforward effect of the receiver in generating and multiplying delayed versions of the received signal.

The inventors have discovered that a large percentage of these errors can be recognized and identified by the receiver. By simulating a receiver configured for a selected symbol code set, and introducing single-chip errors in each chip position of each symbol code, the inventors have discovered that most single-chip errors do not alter a sufficient number of following chips to cause the received symbol code to be misrecognized. Moreover, those received symbol codes that would be misrecognized can be corrected in response to the symbol code that is misrecognized and the number of chip errors that occur in that symbol code.

Figure 17:
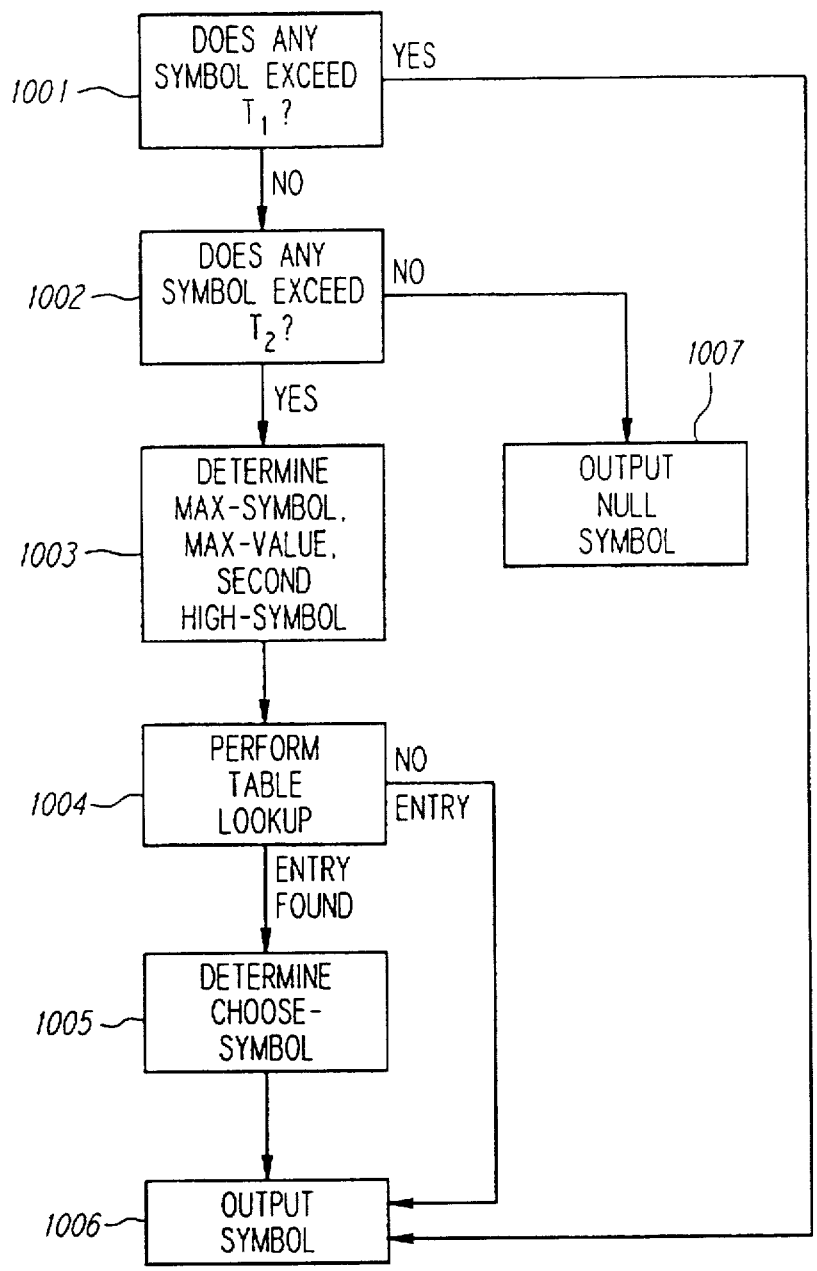
FIG. 17 is a decision procedure for determining a correct symbol in the presence of errors.

FIG. 17 is a diagram of a flow chart for a decision procedure for "correcting" received symbol codes when the received symbol code was detected with a significant number of errors, by determining the symbol code that was most likely to have been actually sent.

In a preferred embodiment, when a code sequence is received, a symbol recognizor 801 receives a set of correlation values, one for each possible symbol code. At a step 1001, the symbol detector 801 may determine whether any one symbol code has a correlation value that exceeds a first threshold $T_1$. If so, the symbol is considered to be unambiguously recognized, and operation proceeds with a step 1006 where the symbol corresponding to the particular symbol code is output. In a particular embodiment, the first threshold $T_1$ is 29 chips out of a possible 32 chips, assuming that preloading is used and that a maximum correlation value is therefore 32 chips.

At a step 1002, the symbol recognizor 801 determines whether one or more symbol codes have a correlation value that exceeds a second threshold $T_2$. If not, there is no symbol code that is considered to have a sufficient match, and the decision procedure continues with a step 1007 where no symbol is output. In a particular embodiment, the second threshold $T_2$ is 23 chips out of a possible 32 chips, assuming the use of preloading.

At a step 1003, based on the set of correlation values, the symbol recognizor 801 determines the symbol code having the highest correlation value, the correlation value for that symbol code, and the symbol code having the next highest correlation value. The symbol code having the highest correlation value is referred to as a MAX-SYMBOL, its correlation value is referred to as a MAX-VALUE, and the symbol code having the second highest correlation value is referred to as a SECOND-HIGH-SYMBOL. The decision procedure may then proceed with a step 1004.

At a step 1004, the symbol recognizor 801 performs a table lookup into a table 806 such as decision Table 17-1, using as an address the MAX-SYMBOL, MAX-VALUE, and SECOND-HIGH-SYMBOL values determined by the symbol recognizor 801 in the step 1003. If no entry for the particular address is found, then the decision procedure may proceed with the step 1006 where the symbol MAX-SYMBOL is output, or undertake appropriate error correction as desired. If an entry is found, then the decision procedure continues to a step 1005.

At a step 1005, the symbol recognizor 801 determines a CHOOSE-SYMBOL value indicated by the entry that was found. The CHOOSE-SYMBOL value may not in some instances be equal to either MAX-SYMBOL or SECOND-HIGH-SYMBOL. The decision procedure continues to a step 1006, where the symbol CHOOSE-SYMBOL is output. If the entry indicates an ambiguous choice between two possible symbols, one of the two may be selected for the value CHOOSE-SYMBOL, and an AMBIGUOUS-SYMBOL flag may be set with the value of the other of the two.

At a step 1006, the chosen symbol is output, and the decision procedure for the particular symbol code is terminated. If the AMBIGUOUS-SYMBOL flag was set with the value of another symbol, the symbol recognizor 801 may output the correlation value of the other symbol code using an out-of-band signaling technique, for possible use by higher-level error detectors, such as CRC matching or parity checking.

At a step 1007, no symbol is output, and the decision procedure for the received symbol code is terminated.

Table 10-1 is a set of code sequences, that may also be used with the error correction and decision procedure of FIG. 17. The symbol codes of Table 10-1 may be generated from a 13-stage shift register with four feedback taps of the positions shown in the brackets reset to each symbol code.

Decision Table 17-1 (also referred to as an error correction table 806), is derived using the code sequences of Table 10-1, for correcting received symbols that may be used with the decision procedure of FIG. 17. The particular example of Table 17-1 was generated by the methodology further described below, but was constructed assuming no use of preloading in the receiver. A similar table could be constructed using the same method for the case in which preloading is used at the receiver.

TABLE 17-1

| MV | MS | SH | CS | MV | MS | SH | CS | MV | MS | SH | CS |
|---|---|---|---|---|---|---|---|---|---|---|---|
| 15 | 6 | 20 | 1 | 15 | 25 | 26 | 13 | 16 | 15 | 22 | 22 |
| 16 | 31 | 12 | 1 | 15 | 2 | 27 | 13 | 15 | 29 | 26 | 23 |
| 16 | 25 | 12 | 1 | 15 | 2 | 17 | 13 | 16 | 26 | 8 | 23 |
| 16 | 26 | 11 | 2 | 15 | 1 | 18 | 14 | 14 | 8 | 21 | 23 |
| 16 | 32 | 11 | 2 | 15 | 1 | 28 | 14 | 15 | 11 | 23 | 23 |
| 15 | 5 | 19 | 2 | 15 | 26 | 25 | 14 | 15 | 19 | 23 | 23 |
| 16 | 13 | 4 | 3 | 14 | 8 | 26 | 14 | 15 | 20 | 24 | 24 |
| 15 | 13 | 31 | 3 | 14 | 11 | 21 | 14 | 15 | 12 | 24 | 24 |
| 15 | 23 | 6 | 3 | 15 | 1 | 14 | 14 | 14 | 7 | 22 | 24 |
| 15 | 24 | 5 | 4 | 15 | 6 | 7 | 15 | 16 | 25 | 2 | 24 |
| 15 | 14 | 32 | 4 | 14 | 3 | 8 | 15 | 15 | 30 | 25 | 24 |
| 15 | 14 | 9 | 4 | 14 | 13 | 17 | 15 | 16 | 10 | 21 | 25 |
| 16 | 32 | 18 | 5 | 14 | 14 | 18 | 16 | 15 | 21 | 25 | 25 |
| 15 | 23 | 25 | 5 | 14 | 4 | 7 | 16 | 15 | 2 | 25 | 25 |
| 15 | 28 | 29 | 5 | 15 | 5 | 8 | 16 | 16 | 3 | 25 | 25 |
| 16 | 23 | 15 | 5 | 15 | 22 | 30 | 17 | 16 | 4 | 26 | 26 |
| 16 | 24 | 16 | 6 | 16 | 15 | 17 | 17 | 15 | 1 | 26 | 26 |
| 15 | 27 | 30 | 6 | 16 | 9 | 17 | 17 | 15 | 22 | 26 | 26 |
| 15 | 24 | 26 | 6 | 15 | 9 | 11 | 17 | 16 | 9 | 22 | 26 |
| 16 | 31 | 17 | 6 | 15 | 7 | 9 | 17 | 14 | 18 | 20 | 27 |
| 15 | 13 | 30 | 7 | 15 | 18 | 10 | 18 | 15 | 24 | 27 | 27 |
| 16 | 10 | 18 | 7 | 15 | 10 | 12 | 18 | 16 | 25 | 27 | 27 |
| 15 | 27 | 12 | 7 | 16 | 10 | 18 | 18 | 15 | 22 | 27 | 27 |
| 15 | 3 | 7 | 7 | 16 | 16 | 18 | 18 | 18 | 21 | 28 | 28 |
| 15 | 4 | 8 | 8 | 15 | 21 | 29 | 18 | 15 | 21 | 28 | 28 |
| 15 | 28 | 11 | 8 | 16 | 29 | 20 | 19 | 16 | 26 | 28 | 28 |
| 16 | 9 | 17 | 8 | 15 | 29 | 23 | 19 | 15 | 23 | 28 | 28 |
| 15 | 14 | 29 | 8 | 14 | 14 | 24 | 19 | 14 | 17 | 19 | 28 |
| 15 | 5 | 9 | 9 | 15 | 7 | 19 | 19 | 14 | 27 | 15 | 28 |
| 15 | 18 | 13 | 9 | 15 | 8 | 20 | 20 | 15 | 18 | 29 | 29 |
| 16 | 19 | 23 | 9 | 14 | 13 | 23 | 20 | 14 | 1 | 6 | 29 |
| 16 | 19 | 11 | 9 | 15 | 30 | 24 | 20 | 14 | 23 | 14 | 29 |
| 16 | 20 | 12 | 10 | 16 | 30 | 25 | 20 | 15 | 9 | 29 | 29 |
| 16 | 20 | 24 | 10 | 16 | 16 | 21 | 21 | 15 | 14 | 21 | 29 |
| 15 | 17 | 13 | 10 | 15 | 7 | 21 | 21 | 15 | 18 | 21 | 29 |
| 15 | 6 | 10 | 10 | 15 | 12 | 21 | 21 | 15 | 18 | 4 | 29 |
| 14 | 2 | 29 | 11 | 14 | 6 | 9 | 21 | 15 | 17 | 3 | 30 |
| 15 | 8 | 11 | 11 | 14 | 4 | 9 | 21 | 15 | 17 | 22 | 30 |
| 16 | 9 | 11 | 11 | 14 | 6 | 7 | 21 | 15 | 13 | 22 | 30 |
| 15 | 6 | 11 | 11 | 15 | 6 | 7 | 21 | 15 | 10 | 30 | 30 |
| 18 | 6 | 11 | 11 | 15 | 6 | 13 | 21 | 14 | 24 | 13 | 30 |
| 18 | 5 | 12 | 12 | 16 | 7 | 21 | 21 | 14 | 2 | 5 | 30 |
| 15 | 5 | 12 | 12 | 16 | 8 | 22 | 22 | 15 | 17 | 30 | 30 |

TABLE 17-1-continued

| MV | MS | SH | CS | MV | MS | SH | CS | MV | MS | SH | CS |
|----|----|----|----|----|----|----|----|----|----|----|----|
| 16 | 10 | 12 | 12 | 15 | 5  | 14 | 22 | 14 | 22 | 23 | 31 |
| 15 | 7  | 12 | 12 | 15 | 5  | 8  | 22 | 14 | 12 | 24 | 31 |
| 14 | 1  | 30 | 12 | 14 | 5  | 8  | 22 | 14 | 29 | 19 | 31 |
| 14 | 11 | 19 | 12 | 14 | 3  | 10 | 22 | 14 | 30 | 20 | 32 |
| 15 | 2  | 13 | 13 | 14 | 5  | 10 | 22 | 14 | 11 | 23 | 32 |
| 14 | 12 | 22 | 13 | 15 | 11 | 22 | 22 | 15 | 21 | 24 | 32 |
| 14 | 7  | 25 | 13 | 15 | 8  | 22 | 22 | 17 | 22 | 27 | 27 |

For the symbols shown in Table 10-1, analysis of the effect of individual chip errors in each possible position of a 32-chip symbol shows that the number of symbol code recognition errors is approximately 10% of the number of possible error positions. Analysis also shows that for each symbol code recognition error caused by the individual chip error, there is an identifiable error syndrome that allows unambiguous error correction with a probability $\geq 99\%$ (presuming that chip errors are equidistributed among individual chip positions in symbols) and with probability that a specific error cannot be corrected that is less than or equal to $3.9 \times 10^{-3}$ (0.39%). Thus, the probability of a noncorrectable symbol error where there is a chip error rate as high as 1% is only $1.28 \times 10^{-3}$ (0.13%). For the symbols shown in Table 10-1, assuming no preloading, a first threshold $T_1$ is preferably 18, and the second threshold $T_2$ is preferably 14. The abbreviations appearing in Table 17-1 have the following meanings: MV=MAX-VALUE, MS=MAX-SYMBOL, SH=SECOND-HIGH-SYMBOL, and CS=CHOOSE-SYMBOL. MAX-SYMBOL represents the symbol having the highest correlation value. MAX-VALUE represents the correlation value for MAX-SYMBOL. SECOND-HIGH-SYMBOL represents the symbol having the second highest correlation value. CHOOSE-SYMBOL represents the symbol assumed to be the correct symbol, based on the parameters MAX-SYMBOL, MAX-VALUE, and SECOND-HIGH-SYMBOL, and is therefore the symbol chosen in the decision procedure of FIG. 17. It may be noted that CHOOSE-SYMBOL is frequently different than either MAX-SYMBOL or SECOND-HIGH-SYMBOL.

For example, referring to Table 17-1, if the symbol with the highest correlation value (MAX-SYMBOL) is symbol 14, and the highest correlation value (MAX-VALUE) is 14, then the symbol to choose as the output symbol (CHOOSE-SYMBOL) may be one of several symbols, depending on the value of the symbol with the second highest correlation value (SECOND-HIGH-SYMBOL). If the symbol with the second highest correlation value is symbol 18, for example, then the output symbol should be symbol 16, based on the entries in Table 17-1. If, on the other hand, the symbol with the second highest correlation value is symbol 24, then the output symbol should be symbol 9, based on Table 17-1.

Table 17-1 comprises over 140 entries. Thus, over 140 single chip errors can be corrected using Table 17-1.

Figure 18:
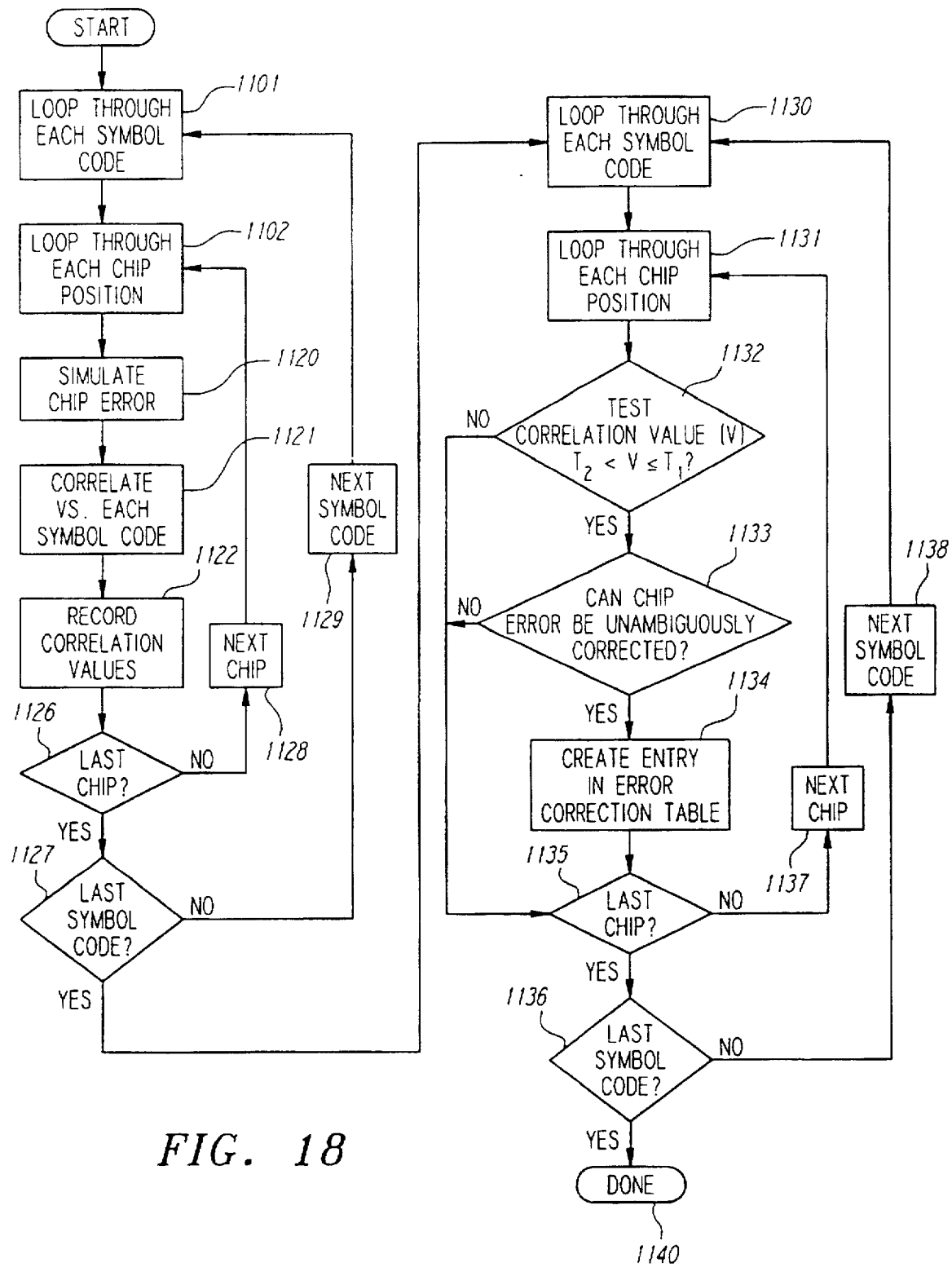
FIG. 18 is a flow chart for constructing an error correction table.

An error correction table 806 such as Table 17-1 may be constructed for an arbitrary group of symbol codes. A method for construction of an error correction table 806 is described below with reference to the steps shown in FIG. 18. For purposes of illustration, FIG. 18 is described with respect to the 32 symbol codes appearing in Table 10-1, each of said symbol codes being 32 chips in length. However, the methodology shown in FIG. 18 can be used with spread spectrum codes of other lengths as well.

Generally in the method of FIG. 18, for each symbol code, a single chip error is simulated in each chip position for each symbol code. For example, for the first symbol code, a chip error is simulated for chip-1, chip-2, chip-3, etc., all the way up to chip-32.

Thus, in a first step 1101 of FIG. 18, the method loops through each symbol code. In a second step 1102, the method loops through each chip of the selected symbol code. In a next step 1120, a single chip error is simulated, until all single chip errors are simulated for each chip in each symbol code. Each simulated chip error results in a new code nearly identical to the original symbol code but differing therefrom in one chip. The new code is correlated by each correlator 804 in step 1121, a process which may be advantageously simulated using a computer. Thus, the new code is correlated 32 times by 32 different correlators 804, including the correlator 804 associated with the original symbol code. The correlation values (i.e., number of agreements) derived from the 32 correlators are compared. The highest correlation value, highest correlation symbol, and second highest correlation symbol are stored (e.g., in an array or table) in step 1122 as MAX-VALUE (MV), MAX-SYMBOL (MS), and SECOND-HIGH SYMBOL (SH), respectively.

The method tests for the last chip in step 1126. If the last chip (e.g., chip-32) is reached, then the method moves on to the next symbol code; otherwise, the method continues by incrementing the chip position in step 1128 and returning to the top of the chip position loop. This procedure is repeated for all the symbol codes (e.g., 32 times). Thus, the method tests for the last symbol code in step 1127. If the last symbol code (e.g., symbol code 32) is reached, then the method moves on to step 1130; otherwise, the method continues by moving on to the next symbol code in step 1129 and returning to the top of the symbol code loop.

Figure 19:
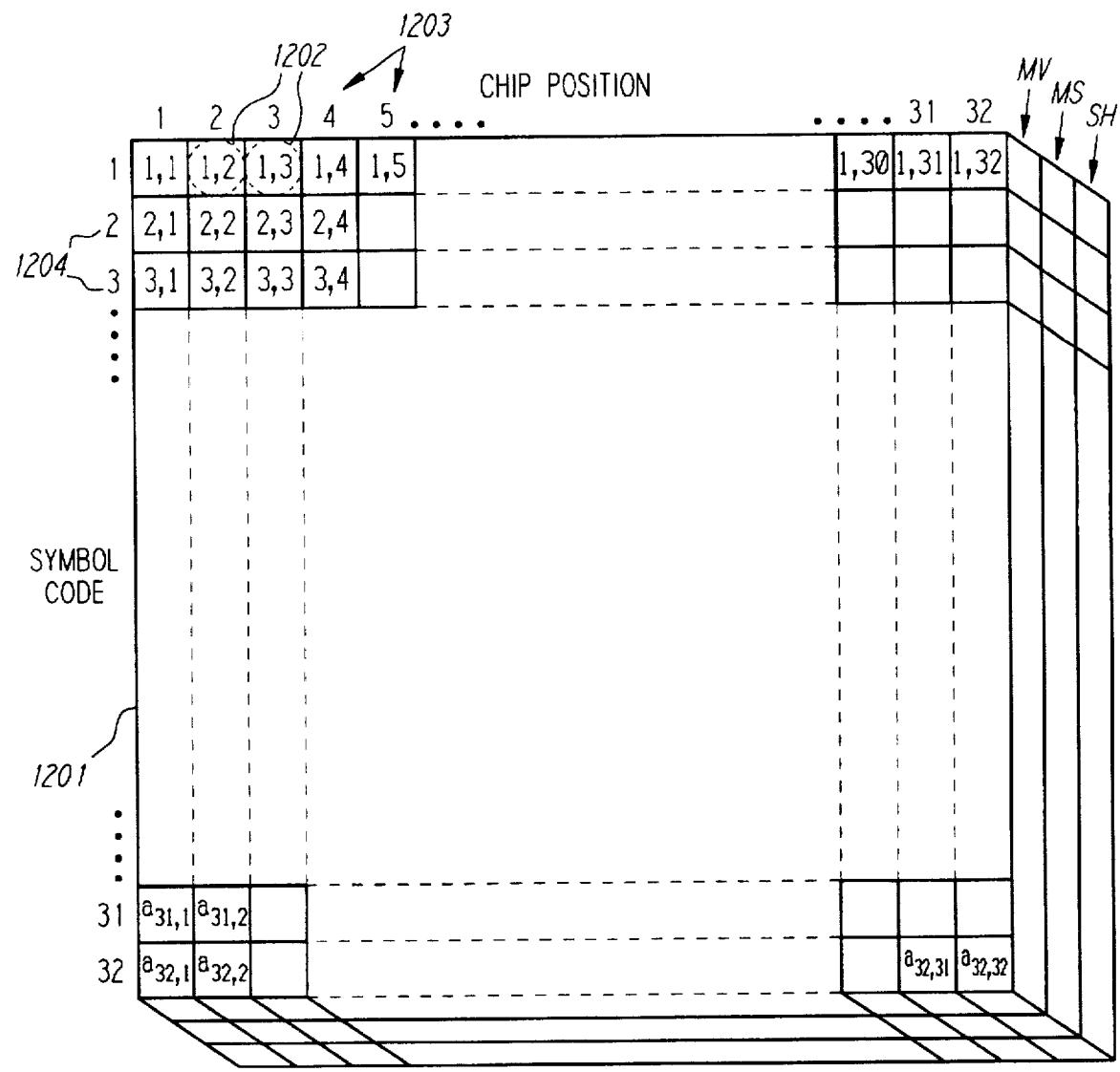
FIG. 19 is a diagram of an array of correlation values which may be used in the process described in the flow chart of FIG. 18.

The described procedure results in single chip error correlation data for each chip position of each symbol code. Thus, a total of 32×32=1024 maximum correlation values (MV) are generated, along with corresponding maximum symbol (MS) and second highest symbol (SH) identities. These values may be represented as an array of values as shown in FIG. 19, and may be stored as such, for example, in a computer memory. In FIG. 19, the numbers across the top of the array 1201 represent the chip error position 1203, and the numbers down the left side of the array 1201 represent the symbol code 1204 (according to the symbols shown in Table 10-1). The entries 1202 for maximum correlation value may range in value from zero (i.e., no agreements) to 32 (i.e., full agreement). The correlation value corresponding to the second highest symbol may also be stored in an additional entry in the array 1201.

Table 17-1 may be generated from an array 1201 such as that shown in FIG. 19. Assuming that the first threshold $T_1$ is set to 18 chips, all entries in array 1201 having $MV \geq 19$ are discarded. Thus, there are no entries in Table 17-1 for array locations showing a correlation value of more than 18 agreements, as in such circumstances the symbol code having the highest correlation is selected, and Table 17-1 would not be accessed by the symbol recognizor 801 (of FIG. 16). Similarly, assuming that the second threshold $T_2$ is set to 14 chips, all entries in array 1201 having MV≦14 are discarded. Thus, there will ordinarily be no entries in Table 17-1 for array locations showing a maximum correlation value of 14 or fewer agreements. Table 17-1 will be accessed by symbol recognizor 801 if the symbol code having the maximum correlation of all of the 32 symbol codes has a correlation value less than first threshold $T_1$, or 18 chips, but greater than the second threshold $T_2$, or 14 chips. Because only certain chip errors (i.e., those leading to a maximum correlation value of between 15 and 18, inclusive) will lead to error correction using Table 17-1, the parameters MV, MS and SH need be stored only for those chip errors.

To generate Table 17-1, each entry 1202 in the array 1201 is examined for each symbol code. Thus, in step 1130, the method begins looping through the entries in array 1201 corresponding to each symbol code. In step 1131, the method begins looping through the entries in array 1201 corresponding to each chip of each symbol code. In a next step 1132, the value of the entry 1202 for maximum correlation value (MV) is examined. If MV is greater than 18 or not greater than 14, then the method proceeds to step 1135, and no entry is made in Table 17-1 for the particular chip error.

If, on the other hand, the value of the entry 1202 is less than or equal to 18 but greater than 14, then all other entries 1202 in the array 1201 are examined in step 1133 and compared against the entry 1202 in question. Thus, if the first entry 1202 in the array 1201 (corresponding to a chip error in chip-1 of the first symbol code) is a maximum correlation value (MV) of, e.g., 28, then entries 1202 for all other symbol codes are examined to see if the recorded MAX-SYMBOL, MAX-VALUE, and SECOND-HIGH SYMBOL match those stored in the array for the particular chip error and symbol code in question. If no match is found, then it is concluded that the symbol code can be recognized if the particular single chip error should occur, based on the particular maximum correlation value, the symbol code identified therewith, and the identity of the symbol code having the second highest correlation value. In such a case, a table entry with MV, MS and SH values is made in the table (e.g., Table 17-1) for symbol recognizor 801.

If, on the other hand, a match is found in the array 1201, then the correct symbol code cannot be unambiguously determined from simply the MV, MS and SH values. Such a situation will occur relatively infrequently. However, in these cases, the correlation value of the second highest symbol can be looked to and compared. In most cases where a match of the MV, MS and SH values occurs, the second highest symbol code correlation value will differ, and thus the correct symbol code can be determined from this additional piece of information. Should more than one entry also have the same second highest symbol code correlation value, an even more rare situation, then further information (e.g., the third highest symbol code) may be used to unambiguously determine the proper output symbol. Alternatively, where the number of possible symbol codes can be reduced to two, the symbol recognizor 801 may merely select one of the two symbol codes with a fifty percent chance of choosing the correct code.

For the particular codes in Table 10-1, it has been determined by the inventors that in eight particular situations, the MV, MS and SH values will not by themselves be sufficient to correct a single chip error and select an output signal without ambiguity. For the majority of these cases (i.e., six out of the eight cases), a symbol may be unambiguously selected as the proper output signal by looking at further information—e.g., the third highest symbol. Alternatively, where there are two choices of symbols to output, the decision logic may simply choose one of the two symbols, having a fifty percent statistical probability of choosing the correct symbol.

The method tests for the last chip in step 1135. If the last chip (e.g., chip-32) is reached, then the method moves on to step 1136; otherwise, the method continues by incrementing the chip position in step 1137 and returning to the top of the chip position loop.

In step 1136, the method tests for the last symbol code in step 1127. If the last symbol code (e.g., symbol code 32) is reached, then construction of the error correction table (Table 17-1) is finished. Otherwise, the method continues by moving to the next symbol code in step 1129 and returning to the top of the symbol code loop, and continues the process until construction of the error correction table is complete.

It should be noted that Table 17-1 has been constructed from data derived by simulated single chip errors. A table may also be constructed, using a methodology similar to that shown in FIG. 18, which takes into account multichip errors (such as a two chip error).

Figure 20:
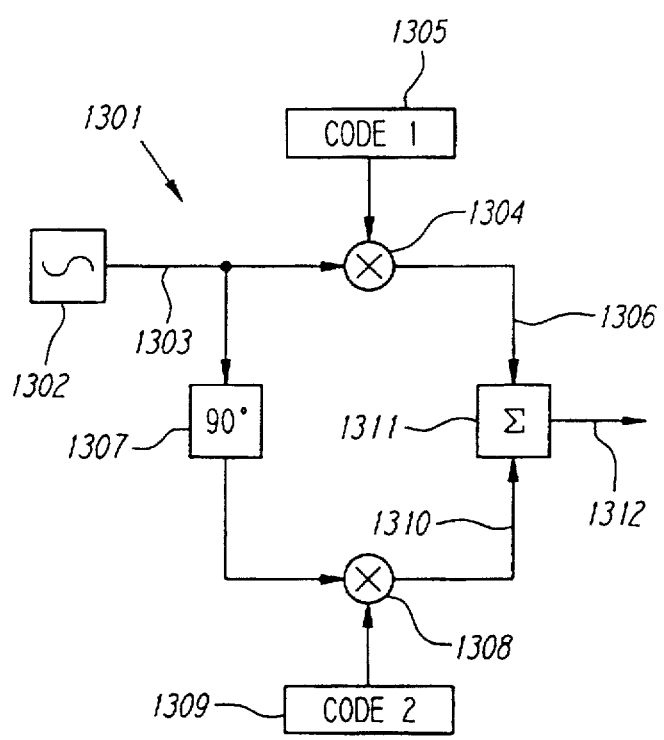
FIG. 20 is a block diagram of an embodiment of a spread spectrum transmitter for sending multiple symbol code sequences.

Another aspect of the present invention pertains to a system for transmitting and receiving simultaneous symbol code sequences. FIG. 20 shows a block diagram of an embodiment of a spread spectrum transmitter 1301 allowing multiple symbol code sequences to be transmitted.

The spread spectrum transmitter 1301 of FIG. 20 comprises a carrier signal generator 1302, which produces a carrier signal 1303. The carrier signal is coupled to an encoder 1304 (e.g., a multiplier). A code sequence 1305 is also coupled to the encoder 1304. The encoder 1304 combines its inputs and produces an encoded signal 1306.

The carrier signal is also coupled to a phase offset 1307, which provides an offset of π/2 radians (i.e., 90 degrees) to the phase of the carrier signal 1303. Other offset amounts may be used, but a 90 degree offset is preferred because the resulting carrier signals generated thereby are orthogonal. The phase offset 1307 may comprise any suitable delay circuit as known in the art. An output of the phase offset 1307 is coupled to another encoder 1308. A second code sequence 1309 is also coupled to the encoder 1308. The second encoder 1308 combines its inputs and produces another encoded signal 1310.

The two encoded signals 1306, 1310 are coupled to a summer 1311, which combines its inputs and produces a superimposed output signal 1312. The output signal 1312 is thereafter amplified and transmitted. The output signal 1312 may be recognized as a quadriphase or offset quadriphase spread spectrum signal, depending on a clock timing relationship between the first and second code sequences 1305, 1309.

A spread spectrum receiver for recognizing multiple symbol code sequences sent simultaneously may be similar to the receivers of FIGS. 5, 6, 8 and/or 16, or as otherwise described herein. The receiver may simultaneously recognize and identify two different symbols in the transmitted signal. Thus the symbol recognizor 801 may comprise a best-2-of-M detector, rather than a best-of-M detector as for the symbol recognizor 714. Accordingly, the symbol recognizor 801 may detect and correct errors in the received sequence of chips to select a pair of symbols 802 that was most likely to have been transmitted, for example, a pair of symbols 802 that both have a minimum Hamming distance from the actually received sequence of chips.

If the symbol recognizor 801 can identify a correct pair of symbols 802 from the match count, it may select that pair of symbols 802. However, in an embodiment of the invention, the symbol recognizor 801 may identify a set of chips to be corrected from the match signals 708, 709.

Once the symbol recognizor 801 recognizes and identifies a pair of symbols 802, it may produce an output symbol. With analog transmission of the symbol pair, the symbols are simply superimposed, and both sets of taps for the two symbols will be recognized. This method may not preserve the order of the symbol pair, so (M choose 2) is the number of possible pairs of symbols 802 and $\log_2$(M choose 2) will be the maximum number of possible data bits, where M is the number of codes in use. The same code symbol cannot be chosen for the symbol pair; otherwise, if the two symbols are not distinct, the resulting transmission may have a waveform resembling a BPSK signal.

Table 20-1 illustrates the relationship between the number of required codes and the maximum number of data bits that may be sent thereby, using the transmitter shown in FIG. 20.

TABLE 20-1

| M = Codes in Use | (M choose 2) | Bits per Symbol Pair |
|---|---|---|
| 9 | 36 | 5 |
| 17 | 136 | 7 |
| 33 | 528 | 9 |
| 46 | 1035 | 10 |

An advantage of this transmission technique is that it provides relatively high order M-ary transmission with only a modest increase in the number of required codes and amount of circuitry needed for their reception.

More than two symbols 802 may be simultaneously transmitted in a similar fashion. For example, a set of four symbols may be simultaneously transmitted using octiphase (8 phase) modulation. With M spreading codes and exactly N simultaneous symbols, there are (M choose N) possible symbol sets. With M spreading codes and up to N, but not necessarily exactly N, simultaneous symbols, there are SUM (i=1 to N) (M choose i) possible symbol sets.

In a preferred embodiment of the invention used in a cellular communication system, one of three distinct sets of 32 spreading codes is selected for each cell, plus there are two separate "preamble" spreading codes used throughout the communication system. Accordingly, in a preferred embodiment, M=34 spreading codes in simultaneous use, of which 32 may be combined in to pairs of symbols 802. In a preferred embodiment, L=32 chips per spreading code, and N=2 simultaneous symbols. Accordingly, in a preferred embodiment, there are (32 choose 2)=496 possible symbol sets, for $\log_2$(496)>8 data bits per L chips.

A preferred communication environment for the embodiments disclosed herein utilizes time division multiple access (TDMA) or time division duplex (TDD) techniques, with or without the addition frequency division multiple access (FDMA) or frequency division duplexing (FDD) techniques. Exemplary TDMA or TDD systems are disclosed, for example, in U.S. patent application Ser. Nos. 08/161,187 (entitled "Method and Apparatus for Establishing Spread Spectrum Communication"), 08/215,306 and 08/293,671 (both entitled "PCS Pocket Phone/Microcell Communication Over-Air Protocol"), and 08/304,091 (entitled "Coherent and Noncoherent CPM Correlation method and Apparatus"), each of which have been previously cited and incorporated herein by reference.

Use of relatively short symbol codes provides rapid acquisition of transmissions that may be particularly suitable for high speed time division communication systems. A particular advantage of the present system is that no initial synchronization signal is required to coordinate a receiver clock with a transmitter clock, and thus no time is lost in initial clock synchronization.

While preferred embodiments are disclosed herein, many variations are possible which remain within the concept and scope of the invention. For example, information which is transmitted from transmitter to receiver is referred to herein as "data", but these data could comprise both data and error-correcting codes, control information, or other signals, and that this would be within the scope and spirit of the invention.

As another example, while the invention is shown herein for a preferred embodiment generally using BPSK encoding of data, other methods of data encoding, such as ternary phase shift keying, QPSK, or other known spread-spectrum techniques, are workable, and are within the scope and spirit of the invention.

What is claimed is:

1. A spread spectrum transmitter comprising:
    a shift register having a plurality of stages including a first stage,
    a plurality of taps connected to selected ones of said stages,
    a plurality of exclusive-OR gates connected to said taps, each exclusive-OR gate outputting a different spread spectrum code, said exclusive-OR gates thereby collectively outputting a plurality of spread spectrum codes, and
    means for selecting, in response to a data signal, one of said spread spectrum codes for transmission, said one selected spread spectrum code being fed back from said means for selecting into the first stage of said shift register.

2. The spread spectrum transmitter of claim 1 wherein said means for selecting comprises a plurality of logic gates each connected to a plurality of data bits from said data signal.

3. The spread spectrum transmitter of claim 1 further comprising a second means for selecting, in response to said data signal, a second spread spectrum code for transmission from among a second plurality of spread spectrum codes, and means for combining and simultaneously transmitting said first selected spread spectrum code and said second selected spread spectrum code.

4. The spread spectrum transmitter of claim 3 wherein said means for combining and simultaneously transmitting said first selected spread spectrum code and said second selected spread spectrum code comprises means for modulating said first selected spread spectrum code with a carrier signal and generating a first modulated signal thereby, means for modulating said second selected spread spectrum code with a phase offset version of said carrier signal and generating a second modulated signal thereby, and means for adding said first modulated signal and said second modulated signal.

5. The spread spectrum transmitter of claim 4 wherein said phase offset version of said carrier signal is 90 degrees phase offset from said carrier signal.

6. The spread spectrum transmitter of claim 3 wherein said means for combining and simultaneously transmitting said first selected spread spectrum code and said second selected spread spectrum code comprises means for modulating said first selected spread spectrum code and said second selected spread spectrum code using offset quadrature phase shift keying.

7. A spread spectrum transmitter for generating a plurality of spread spectrum codes, comprising:

a shift register having a plurality of stages, a plurality of tap sets connected to selected ones of said stages, each tap set defining a different spread spectrum code, wherein each of said spread spectrum codes corresponds to a unique series of data bits, and whereby said shift register outputs one of said spread spectrum codes in response to selection of one of said tap sets, a data register coupled to a data stream, and a code selector connected to said data register whereby one of said tap sets is selected for transmission in response to the contents of said data register, said code selector being connected in feedback configuration to the first stage of said shift register.

8. The spread spectrum transmitter of claim 7, wherein each tap set comprises a plurality of taps, said spread spectrum transmitter further comprising a plurality of exclusive-OR gates, one exclusive-OR gate for each tap set, wherein each tap from each of said tap sets is connected to an input of one of said exclusive-OR gates, and outputs from all of said exclusive-OR gates are connected as inputs to said code selector.

9. The spread spectrum transmitter of claim 7 wherein said code selector comprises a plurality of logic gates.

10. The spread spectrum transmitter of claim 7 wherein all of said spread spectrum codes have the same code length.

11. The spread spectrum transmitter of claim 7 wherein at least one of said spread spectrum codes comprises a selected portion of a longer spread spectrum code.

12. The spread spectrum transmitter of claim 11 wherein said longer spread spectrum code is a non-maximal code.

13. A spread spectrum transmitter comprising:

a shift register having a plurality of stages, a plurality of tap sets coupled to selected ones of said stages, each tap set defining a spreading code from among a plurality of spreading codes, means for periodically selecting one of said spreading codes at a time in response to a data stream, and means for generating, in response to each selected spreading code, a code portion of the selected spreading code, said code portion having a code length L, wherein L is less than or equal to the code length of the shortest of said spreading codes, wherein said code portion is fed back into said shift resister.

14. The spread spectrum transmitter of claim 13 wherein said code portion corresponds to a unique sequence of data bits in said data stream.

15. The spread spectrum transmitter of claim 13 wherein each of said spreading codes corresponds to a different data symbol, each data symbol comprising a unique sequence of data bits.

16. The spread spectrum transmitter of claim 13 wherein at least one of said spreading codes is non-maximal.

17. The spread spectrum transmitter of claim 13 whereby a plurality of code portions are generated in response to said periodically selected spreading codes, wherein the cross-correlation between any two of said code portions generated from different ones of said spreading codes is less than a designated maximum cross-correlation value.

18. The spread spectrum transmitter of claim 13 wherein said spread spectrum transmitter communicates with a receiver, said receiver comprising a receive shift register coupled to an incoming signal containing said code portion, and having receive tap locations matching said code portion, and means for combining said incoming signal with outputs from each of said receive tap locations, and generating a correlation signal thereby.

19. The spread spectrum transmitter of claim 18 wherein said correlation signal comprises a series of consecutive correlation bits of uniform polarity and of predetermined length.

20. The spread spectrum transmitter of claim 17 further comprising a carrier signal generator outputting a carrier signal, a first modulator connected to said carrier signal and said first code portion, a second modulator connected to a second one of said code portions and to a phase offset version of said carrier signal, a summer having two inputs, one input connected to said first modulator and another input connected to said second modulator.

21. The spread spectrum transmitter of claim 20 wherein said phase offset version of said carrier signal is 90 degrees offset in phase from said carrier signal.

22. The spread spectrum transmitter of claim 20 wherein said spread spectrum transmitter communicates with a receiver, said receiver comprising means for receiving a signal containing an output of said summer and simultaneously detecting said first code portion and said second code portion.

23. The spread spectrum transmitter of claim 22 wherein said receiver comprises a best-2-of-M detector.

24. A spread spectrum transmitter for generating a plurality of spread spectrum codes, comprising:

a shift register having a plurality of stages, a plurality of tap sets connected to selected ones of said stages, each tap set defining a different spread spectrum code, wherein each of said spread spectrum codes corresponds to a unique series of data bits, and whereby said shift register outputs one of said spread spectrum codes in response to selection of one of said tap sets, a first data register coupled to a data stream, said first data register serially receiving said data stream, a second data register coupled to said first data register, said second data register periodically receiving the contents of said first data register in parallel, said first data register being clocked by a first data clock, and said second data register being clocked by a second data clock, wherein the rate of said first data clock is an integral multiple of the rate of said second data clock, and a code selector connected to said second data register, whereby an output of one of said tap sets is selected for transmission, said output being coupled to the input of said shift register.

25. The spread spectrum transmitter of claim 24 wherein said code selector comprises a plurality of logic gates.

26. The spread spectrum transmitter of claim 24 wherein at least one of said spread spectrum codes comprises a selected portion of a longer spread spectrum code.

27. The spread spectrum transmitter of claim 26 wherein said longer spread spectrum code is a non-maximal code.

28. The spread spectrum transmitter of claim 24 wherein said integral multiple corresponds to a number of serial register stages in said second data register.

29. The spread spectrum transmitter of claim 1, wherein said spread spectrum transmitter communicates with a receiver, said receiver comprising:

a receive shift register connected to a signal received from said spread spectrum transmitter, said receive shift register comprising a plurality of receive stages;

a plurality of taps connected to receive stages corresponding in location to the taps connected to the stages of the shift register in said spread spectrum transmitter; and a modulo-two adder connected to each of said plurality of taps, said modulo-two adder outputting a correlation signal.

30. The spread spectrum transmitter of claim 29, wherein each exclusive-OR gate of said spread spectrum transmitter is connected to exactly two of said taps.

31. The spread spectrum transmitter of claim 7, wherein said spread spectrum transmitter communicates with a receiver, said receiver comprising:

a receive shift register connected to a signal received from said spread spectrum transmitter, said receive shift register comprising a plurality of receive stages;

a tap set connected to receive stages in the same locations as the tap set connected to the stages of the shift register in said spread spectrum transmitter; and a modulo-two adder connected to said tap set, said modulo-two adder outputting a correlation signal.

32. The spread spectrum transmitter of claim 24, wherein said spread spectrum transmitter communicates with a receiver, said receiver comprising:

a receive shift register connected to a signal received from said spread spectrum transmitter, said receive shift register comprising a plurality of receive stages;

a tap set connected to receive stages in the same locations as the tap set connected to the stages of the shift register in said spread spectrum transmitter; and a modulo-two adder connected to said tap set, said modulo-two adder outputting a correlation signal.

33. A method for transmitting a spread spectrum signal, comprising the steps of:

serially clocking a data stream into a first data register;

transferring in parallel the contents of said first register into a second data register;

simultaneously generating a plurality of spread spectrum codes by serially clocking a shift register and, for each spread spectrum code being simultaneously generating, modulo-two adding the contents of at least two stages of said shift register;

periodically selecting for transmission one of said spread spectrum codes according to the contents of said second data register; and feeding back said selected one of said spread spectrum codes into said shift register.

* * * * *

UNITED STATES PATENT AND TRADEMARK OFFICE
CERTIFICATE OF CORRECTION

PATENT NO.   : 5,790,591
DATED        : August 4, 1998
INVENTOR(S)  : Robert Gold and Robert C. Dixon It is certified that error appears in the above-identified patent and that said Letters Patent is hereby corrected as shown below:

In column 37, line 43, please delete the word "resister" and replace with --register--.

Signed and Sealed this

Twenty-second Day of December, 1998

Attest:

BRUCE LEHMAN

*Attesting Officer*   *Commissioner of Patents and Trademarks*